(12) United States Patent
Pettersson et al.

(10) Patent No.: US 10,491,805 B2
(45) Date of Patent: Nov. 26, 2019

(54) METHODS AND APPARATUSES FOR CAPTURING MULTIPLE DIGITAL IMAGE FRAMES

(71) Applicant: Microsoft Technology Licensing, LLC, Redmond, WA (US)

(72) Inventors: Gustaf Pettersson, Lund (SE); Johan Windmark, Lund (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 578 days.

(21) Appl. No.: 14/819,089

(22) Filed: Aug. 5, 2015

(65) Prior Publication Data
US 2017/0041527 A1  Feb. 9, 2017

(51) Int. Cl.
*H04N 5/232* (2006.01)
*H04N 5/235* (2006.01)
*G06F 3/0484* (2013.01)

(52) U.S. Cl.
CPC ..... *H04N 5/23216* (2013.01); *G06F 3/04847* (2013.01); *H04N 5/2356* (2013.01); *H04N 5/23293* (2013.01)

(58) Field of Classification Search
CPC ................................................. H04N 5/23216
See application file for complete search history.

(56) References Cited

U.S. PATENT DOCUMENTS

| | | | |
|---|---|---|---|
| 5,333,027 A * | 7/1994 | Matsushima | G02B 7/28 396/130 |
| 5,966,446 A | 10/1999 | Davis | |
| 8,154,647 B2 | 4/2012 | Ferren | |
| 8,780,232 B2 | 7/2014 | Craig et al. | |
| 8,810,686 B2 | 8/2014 | Ju | |
| 8,830,341 B2 | 9/2014 | Pore | |
| 8,933,985 B1 | 1/2015 | Rapaport et al. | |
| 9,367,220 B2 * | 6/2016 | Izaki | G06F 3/04845 |
| 9,635,280 B2 * | 4/2017 | Kazami | H04N 5/2352 |

(Continued)

FOREIGN PATENT DOCUMENTS

WO    2014123756 A1    8/2014

OTHER PUBLICATIONS

"Bracketing", Published on: Aug. 28, 2014 Available at: http://www.camerarc.com/download/Help/hs160.htm.

(Continued)

*Primary Examiner* — William L Bashore
*Assistant Examiner* — Nathan K Shrewsbury

(57) ABSTRACT

An apparatus and a method for capturing a bracketing sequence of digital image frames. An apparatus includes a digital camera and at least one memory including camera settings. The apparatus further includes a processor configured to control operation of the digital camera together with the camera settings. The apparatus further includes a user interface for at least one of inputting and adjusting the camera settings. The user interface enables user to manually define an image capture sequence including a first camera setting input and a second camera setting input. The processor is configured to store the image capture sequence in the at least one memory, and to control the digital camera to capture a bracketing sequence of digital image frames using the first camera setting input and the second camera setting input.

20 Claims, 12 Drawing Sheets

(56) References Cited

U.S. PATENT DOCUMENTS

| | | | | |
|---|---|---|---|---|
| 9,704,250 | B1* | 7/2017 | Shah | G06T 7/0065 |
| 9,760,267 | B2* | 9/2017 | Tarvainen | H04N 5/23216 |
| 2003/0081140 | A1* | 5/2003 | Furukawa | H04N 5/235 |
| | | | | 348/362 |
| 2006/0044444 | A1* | 3/2006 | Okamoto | H04N 5/232 |
| | | | | 348/333.05 |
| 2007/0058061 | A1* | 3/2007 | Nakayama | H04N 5/232 |
| | | | | 348/294 |
| 2007/0109411 | A1* | 5/2007 | Jung | H04N 1/00132 |
| | | | | 348/207.1 |
| 2007/0200934 | A1* | 8/2007 | Jung | G06T 7/70 |
| | | | | 348/218.1 |
| 2007/0274563 | A1* | 11/2007 | Jung | H04N 1/00352 |
| | | | | 382/103 |
| 2010/0194963 | A1* | 8/2010 | Terashima | G06F 17/3028 |
| | | | | 348/333.11 |
| 2010/0289916 | A1* | 11/2010 | Battles | H04N 5/235 |
| | | | | 348/222.1 |
| 2012/0274806 | A1* | 11/2012 | Mori | H04N 5/23216 |
| | | | | 348/223.1 |
| 2013/0179831 | A1* | 7/2013 | Izaki | G06F 3/04845 |
| | | | | 715/800 |
| 2013/0329092 | A1* | 12/2013 | Wong | H04N 5/2356 |
| | | | | 348/241 |
| 2014/0176754 | A1* | 6/2014 | Kodanna | H04N 5/2356 |
| | | | | 348/222.1 |
| 2014/0223376 | A1* | 8/2014 | Tarvainen | H04N 5/23216 |
| | | | | 715/833 |
| 2014/0267883 | A1* | 9/2014 | Vidal-Naquet | G06T 7/00 |
| | | | | 348/362 |
| 2014/0354842 | A1 | 12/2014 | Pflughaupt et al. | |
| 2015/0130981 | A1 | 5/2015 | Hagiwara | |
| 2015/0181102 | A1* | 6/2015 | Oda | H04N 5/2355 |
| | | | | 348/229.1 |
| 2015/0326772 | A1* | 11/2015 | Kazami | H04N 5/2352 |
| | | | | 348/252 |
| 2015/0350544 | A1* | 12/2015 | Williams | H04N 5/23245 |
| | | | | 348/239 |
| 2016/0044257 | A1* | 2/2016 | Venkataraman | H04N 5/2258 |
| | | | | 348/239 |
| 2016/0112630 | A1* | 4/2016 | Kanumuri | H04N 5/23222 |
| | | | | 348/239 |

OTHER PUBLICATIONS

"Bracketing", Published on: Mar. 27, 2014 Available at: http://www.digicamcontrol.com/manual/bracketing.

Meyer, Jeff, "Bracketing Explained: What You Need to Know about Maximising Detail", Published on: Nov. 13, 2012 Available at: http://www.digitalcameraworld.com/2012/11/13/bracketing-explained-what-you-need-to-know-about-maximising-detail-in-your-photos/.

"Nokia Lumia 930 Camera Tips & Tricks", Published on: Aug. 23, 2014 Available at: http://www.geeksquad.co.uk/articles/nokia-lumia-930-camera-tips-tricks.

Pye, "Continuous Shooting Mode: A Useful Feature in HDR Photography", Published on: Mar. 2013 Available at: http://www.slrlounge.com/school/continuous-shooting-mode-a-useful-feature-in-hdr-photography/.

"CHDK Firmware Usage/AllBest (obsolete)", Published on: Feb. 28, 2012 Available at: http://chdk.wikia.com/wiki/CHDK_firmware_usage/AllBest_(obsolete).

"Auto Bracketing", Published on: Jan. 3, 2003 Available at: http://www.cs.mtu.edu/~shene/DigiCam/User-Guide/4500/EXPOSURE/EV-auto-bracketing.html.

"Exposure Settings: Exposure Bracketing", Published on: Dec. 30, 2009 Available at: http://cpn.canon-europe.com/content/education/infobank/exposure_settings/exposure_bracketing.do.

Meyer, Jeff, "Exposure Bracketing: How to do it Manually and How your AEB can Help", Published on: Nov. 13, 2013 Available at: http://www.digitalcameraworld.com/2013/11/13/exposure-bracketing-how-to-do-it-manually-and-how-your-aeb-button-can-help/.

"International Search Report and Written Opinion Issued in PCT Application No. PCT/US2016/039709", dated Sep. 23, 2016, 13 Pages.

Alakarhu, et al., "Pushing the Boundaries of Digital Imaging", Retrieved from <<https://web.archive.org/web/20131101080842/http://i.nokia.com/blob/view/-/2723846/data/1/-/Lumia1020-whitepaper.pdf>>, Nov. 1, 2013, 23 Pages.

"International Preliminary Report on Patentability Issued in PCT Application No. PCT/US2016/039709", dated Jun. 23, 2017, 9 Pages.

\* cited by examiner

878

880

METHODS AND APPARATUSES FOR CAPTURING MULTIPLE DIGITAL IMAGE FRAMES

TECHNICAL FIELD

The present application relates generally to user interfaces in digital cameras.

BACKGROUND

Nowadays, digital cameras present a variety of camera setting options to their users to enable the users to capture images in a desired manner. In some circumstances, users of the digital cameras may want to capture several images of a same scene with different camera settings. For example, a user may want to capture one image of a scene with a 'Flash ON' setting and another image of the same scene with a 'Flash OFF' setting. In another example scenario, a user may want to capture multiple images of the scene by varying levels of white balance or zoom. The user may then choose the best image of the scene from among the captured images, or in some cases, choose to process the captured images to generate the desired image of the scene.

In an example scenario, a user can capture several independent images using an application/graphical user interface (GUI) which allows manual setting of exposure time, focus, white balance, and the like. The user may set the desired settings and then capture an image, then change the settings and capture a second image, and repeat this process until a sufficient number of images have been captured. However, such an approach is tedious for the user and, moreover, a time delay between two captured images on account of manual input of settings subsequent to each captured image may not be desirable to the user. In another example scenario, the user may use a dedicated bracketing application, which enables the user to take multiple shots of a scene with predefined settings. However, in such a scenario, the user is required to maintain a separate application and, moreover, GUIs of such dedicated bracketing applications are typically not easy to use. It is desirable to provide an easy way for the user to capture multiple images of a scene with their regular digital cameras while precluding the need to maintain a dedicated bracketing application.

The embodiments described below are not limited to implementations, which solve any or all of the disadvantages of known devices.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

In an embodiment, an apparatus is presented for capturing a bracketing sequence of digital image frames. The apparatus includes a digital camera and at least one memory including camera settings. The apparatus further includes a processor communicably coupled with the digital camera and the at least one memory. The processor is configured to control operation of the digital camera together with the camera settings stored in the at least one memory. The apparatus further includes a user interface for at least one of inputting and adjusting the camera settings. The user interface is configured to enable a user to manually define an image capture sequence. The image capture sequence includes a first camera setting input and a second camera setting input. The first camera setting input includes at least one first capture parameter value and a first number of digital image frames to capture using the at least one first capture parameter value. The first camera setting input is stored in the image capture sequence. The second camera setting input includes at least one second capture parameter value and a second number of digital image frames to capture using the at least one second capture parameter value. The second camera setting input is stored in the image capture sequence. The processor is further configured to store the so formed image capture sequence in the at least one memory, and to control the digital camera to capture a bracketing sequence of digital image frames using the first camera setting input and the second camera setting input.

In another embodiment, an apparatus is presented for capturing a bracketing sequence of digital image frames. The apparatus includes a digital camera and at least one memory including camera settings. The apparatus further includes a processor communicably coupled with the digital camera and the at least one memory and configured to control operation of the digital camera together with the camera settings stored in the at least one memory. The apparatus further includes a user interface for at least one of inputting and adjusting the camera settings. The user interface is configured to enable a user to manually define an image capture sequence. The image capture sequence includes a first camera setting input and a second camera setting input. The first camera setting input includes a value for at least two different capture parameters. The first camera setting input is stored in the image capture sequence to be used for capturing a first digital image frame. The second camera setting input includes a value for the at least two different capture parameters. The second camera setting input is stored in the image capture sequence to be used for capturing a second digital image frame. The processor is further configured to store the so formed image capture sequence in the at least one memory, and to control the digital camera to capture a bracketing sequence of digital image frames using the first camera setting input and the second camera setting input.

In another embodiment, a method is presented for capturing a bracketing sequence of digital image frames. The method includes providing a user interface for at least one of inputting and adjusting camera settings associated with a digital camera. The user interface is configured to enable a user to manually define an image capture sequence. The method further includes receiving, by a processor, a first camera setting input provided by the user using the user interface. The first camera setting input includes at least one first capture parameter value and a first number of digital image frames to capture using the at least one first capture parameter value. Further, the method includes storing, by the processor, the first camera setting input in the image capture sequence. The method further includes receiving, by the processor, a second camera setting input provided by the user using the user interface. The second camera setting input includes at least one second capture parameter value and a second number of digital image frames to capture using the at least one second capture parameter value. The method further includes storing, by the processor, the second camera setting input in the image capture sequence. Thereafter, the method includes causing, by the processor, a capture of a bracketing sequence of digital image frames by the digital camera using the first camera setting input and the second camera setting input.

In another embodiment, a method is presented for capturing a bracketing sequence of digital image frames. The method includes providing a user interface for at least one of inputting and adjusting camera settings associated with a digital camera. The user interface is configured to enable a user to manually define an image capture sequence. The method further includes receiving, by a processor, a first camera setting input provided by the user using the user interface. The first camera setting input includes a value for at least two different capture parameters to be used for capturing a first digital image frame. Further, the method includes storing, by the processor, the first camera setting input in the image capture sequence. The method further includes receiving, by the processor, a second camera setting input provided by the user using the user interface. The second camera setting input includes a value for the at least two different capture parameters to be used for capturing a second digital image frame. The method further includes storing, by the processor, the second camera setting input in the image capture sequence. Thereafter, the method includes causing, by the processor, a capture of a bracketing sequence of digital image frames by the digital camera using the first camera setting input and the second camera setting input.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the following accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
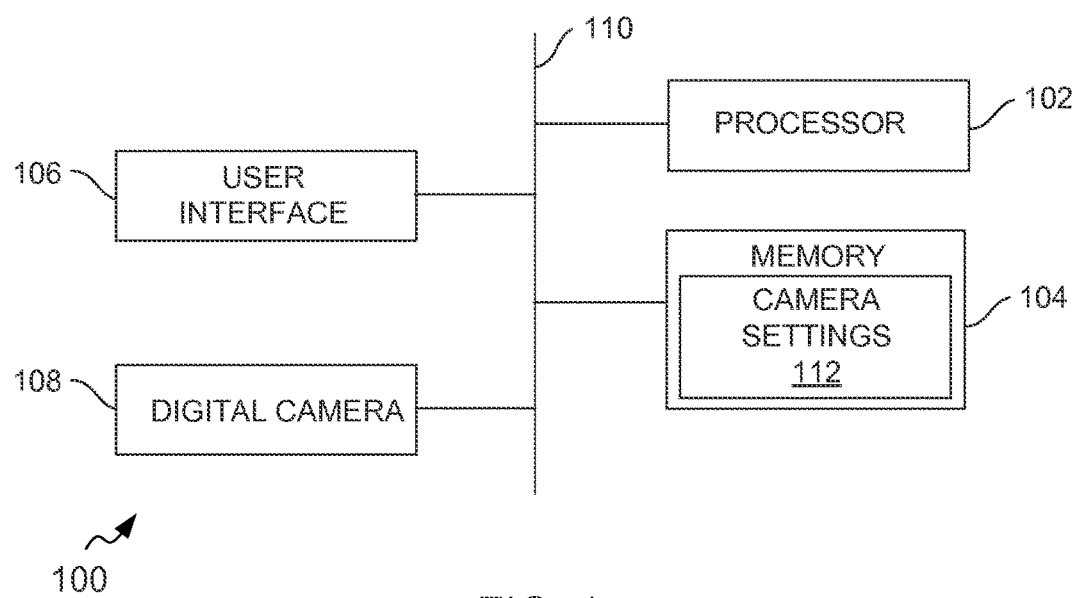
FIG. 1 is a block diagram showing an apparatus, in accordance with an example embodiment.

FIG. 1 is a block diagram showing an apparatus 100, in accordance with an example embodiment. It is understood that the apparatus 100 as illustrated and hereinafter described is merely illustrative of an apparatus that could benefit from embodiments of the disclosure and, therefore, should not be taken to limit the scope of the disclosure. The apparatus 100 may be a mobile phone, a laptop computer, a tablet computer, a media player, a camera, a video recorder, a global positioning system (GPS) apparatus, and/or any other type of electronic system including a programmable camera. It is noted that the apparatus 100 may include fewer or more components than those depicted in FIG. 1. Moreover, the apparatus 100 may be implemented as a centralized apparatus, or, alternatively, the various components of the apparatus 100 may be deployed in a distributed manner while being operatively coupled to each other. In an embodiment, one or more components of the apparatus 100 may be implemented as a set of software layers on top of existing hardware systems. In an exemplary scenario, the apparatus 100 may be any machine capable of executing a set of instructions (sequential and/or otherwise) so as to enable a capturing of a bracketing sequence of digital image frames.

In at least one example embodiment, the apparatus 100 includes a processor for example, a processor 102, and at least one memory for example, a memory 104. The memory 104 is capable of storing machine executable instructions. Further, the processor 102 is capable of executing the stored machine executable instructions. The processor 102 may be embodied in a number of different ways. In an embodiment, the processor 102 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In at least one example embodiment, processor 102 utilizes computer program code to cause the apparatus 100 to perform one or more actions.

The memory 104 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

In at least one embodiment, the apparatus 100 includes a user interface 106 for providing output and/or receiving input. The user interface 106 is configured to be in communication with the processor 102 and the memory 104. Examples of the user interface 106 include, but are not limited to, input interface and/or output interface. Examples of the input interface may include, but are not limited to, a keyboard, a mouse, a joystick, a keypad, a touch screen, soft keys, a microphone, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the processor 102 may include user interface circuitry configured to control at least some functions of one or more elements of the user interface 106, such as, for example, a speaker, ringer, microphone, display, and/or the like. The processor 102 and/or the user interface circuitry may be configured to control one or more functions of the one or more elements of the user interface 106 through computer program instructions, for example, software and/or firmware, stored on a memory, for example, the memory 104, and/or the like, accessible to the processor 102.

In an example embodiment, the apparatus 100 includes one or more media capturing elements, for example one or more digital cameras, such as a digital camera 108. The digital camera 108 is configured to be in communication with the processor 102 and/or other components of the apparatus 100 to capture digital image frames, videos and/or other graphic media. It is noted that the terms 'digital image frame', 'digital image' and 'image' are used interchangeably throughout the description, and should be understood as same, unless otherwise suggested by the context. The digital camera 108 may include hardware and/or software necessary for creating a digital image frame from a captured image. For example, the digital camera may include hardware, such as a lens or other optical component(s) such as one or more image sensors including, but not limited to, complementary metal-oxide semiconductor (CMOS) image sensor, charge-coupled device (CCD) image sensor, back-side illumination sensor (BSI) and the like. Alternatively, the digital camera 108 may include only the hardware for viewing a digital image frame, while a memory device of the apparatus 100 stores instructions for execution by the processor 102 in the form of software for creating a digital image frame from a captured image. In an example embodiment, the digital camera 108 may further include a processing element such as a co-processor that assists the processor 102 in processing image frame data and an encoder and/or decoder for compressing and/or decompressing image frame data. The encoder and/or decoder may encode and/or decode according to a standard format, for example, a Joint Photographic Experts Group (JPEG) standard format.

The various components of the apparatus 100, such as components (102-108) may communicate with each other via a centralized circuit system 110 to capture the bracketing sequence of digital image frames. The centralized circuit system 110 may be various devices configured to, among other things, provide or enable communication between the components (102-108) of the apparatus 100. In certain embodiments, the centralized circuit system 110 may be a central printed circuit board (PCB) such as a motherboard, main board, system board, or logic board. The centralized circuit system 110 may also, or alternatively, include other printed circuit assemblies (PCAs) or communication channel media.

In at least one embodiment, the memory 104 is configured to store camera settings 112 corresponding to the digital camera 108. In at least one embodiment, the camera settings 112 include adjustable settings for capture parameters such as exposure compensation, shutter speed, international standards organization (ISO), white balance, delay, zoom, aperture, flash and flash color temperature. For example, the memory 104 may store values of shutter speed setting ranging from '1/1600' of a second to '4' seconds. In another example scenario, the memory 104 may store values of exposure compensation or brightness component from '−3.0' to '+3.0'. In at least one embodiment, the processor 102 is communicably coupled with the digital camera 108 and the memory 104 and configured to control operation of the digital camera 108 together with the camera settings 112 stored in the memory 104. It is noted that the term 'adjustable settings' as used throughout the description implies settings, which are capable of receiving an input as well as receiving adjustment to a current setting or a capture parameter value depending upon applicable context. In at least one example embodiment, the adjustable settings are configured to enable at least one of the inputting and the adjusting of capture parameter values corresponding to the at least one capture parameter. In at least one embodiment, the user interface 106 is configured to facilitate inputting and/or adjusting of the camera settings 112 so as to enable a user to manually define an image capture sequence. To that effect, the user interface 106 presents a first interactive display to the user. The first interactive display presented to the user is explained with reference to FIG. 2

Figure 2:
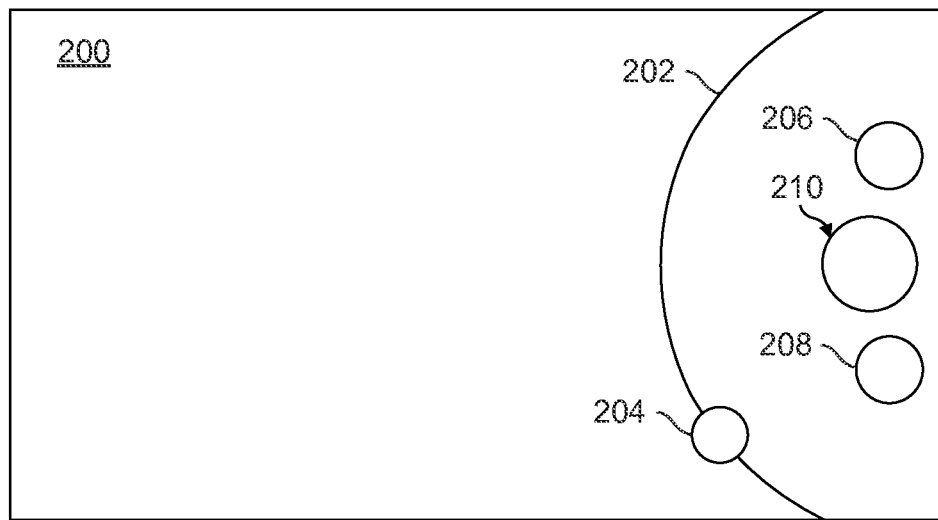
FIG. 2 is a diagram illustrating an example representation of a first interactive display presented to a user, in accordance with an example embodiment.

FIG. 2 is a diagram illustrating an example representation of a first interactive display 200 presented to a user, in accordance with an example embodiment. In at least one example embodiment, an apparatus, such as the apparatus 100 may present the first interactive display 200 to the user upon receiving an input indicative of the user's desire to adjust settings of one or more capture parameters associated with a digital camera, such as the digital camera 108. In an embodiment, the user may access a 'settings operator' while in an image viewfinder mode to indicate desire to adjust settings of one or more capture parameters prior to capturing image of a scene. The apparatus may be caused to display the first interactive display 200 to the user upon receiving such an indication.

In at least one embodiment, the first interactive display 200 is configured to display adjustable settings corresponding to at least one capture parameter. In FIG. 2, the first interactive display 200 is depicted to exemplarily display a slider interface element 202 configured to enable a user to adjust settings for a capture parameter (for example, for capture parameters like shutter speed, focus, etc.). It is understood that the first interactive display 200 is depicted to display only one slider interface element for illustrative purposes and that the first interactive display 200 may display multiple slider interface elements, such as the slider interface element 202, for adjusting settings of multiple capture parameters. Further, it is noted that the slider interface element 202 is depicted to be a curvilinear slider interface element for illustrative purposes. In at least one example embodiment, the curvilinear slider interface element is an elliptical slider interface element having foci proximate to a right boundary of the first interactive display 200. However, the position of the foci may vary. For example, the foci may be positioned within a display region associated with the first interactive display 200, may be positioned beyond the boundary of the display region 200, may be positioned beyond the apparatus, etc. Further, in at least one example embodiment, the elliptical slider interface element relates to a partial ellipse. For example, the elliptical slider interface element may relate to a segment of an ellipse. However, the slider interface element 202 may not be limited to the curvilinear slider interface element depicted in FIG. 2. It is understood that various implementations of the slider interface element 202 that are associated with a contour that allows for ergonomically simple utilization may be possible. It is noted that various positions along the contour of the linear shape of the slider interface element 202 correspond to various values of the setting for the capture parameter.

The slider interface element 202 is associated with a selection point 204, which may be utilized in conjunction with the slider interface element 202 such that position of the selection point 204 along the contour of the slider interface element 202 may identify a value, i.e. the first capture parameter value, associated with the setting for the capture parameter. A user may cause adjustment of a setting by way of causing a change in the position of the selection point 204 relative to the slider interface element 202, such as for example, by dragging the selection point 204 along the contour of the slider interface element 202 using a touch-input or by using a mouse or using any other input means. In such circumstances, the apparatus may determine the first capture parameter value to be based, at least in part, on a position of the selection point 204 relative to the corresponding slider interface element 202. For example, the apparatus may correlate position of the selection point 204 along the contour of the slider interface element 202 with the arrangement of values along the contour of the slider interface element 202 to determine the first capture parameter value. In at least one example embodiment, a user may perform one or more inputs to manipulate the slider interface element 204 displayed by the apparatus. In at least one example embodiment, the indication of the input relates to any communication that the input occurred, such as a message, a function call, modification of a variable, and/or the like.

In an embodiment, the first interactive display 200 may also display a numeral operator 206 configured to receive user input indicating a first number of digital image frames to be captured using the chosen setting for the capture parameter. Alternatively, the number of digital image frames may be input by the user with an additional slider interface element (as will be explained with reference to FIG. 3). Upon providing input related to the first capture parameter value, the user may utilize the numeral operator 206 to provide an input for a number of digital image frames to be captured using the first capture parameter value. In an embodiment, the numeral operator 206 is configured to display a "1" numeral by default indicative of a minimum number of digital image frames to be captured using the first capture parameter value to be one. In an embodiment, the user may increase the first number of digital image frames to be captured from its default value of "1" by providing, for example, a tap input equivalent to a number of digital image frames desired to be captured. In an embodiment, a selection of the numeral operator 206 for an elongated period of time (for example, greater than a threshold of say five seconds) may reset the numeral operator 206 to a default value, thereby enabling change to the numeral operator value from an existing numeral value. In an embodiment, the selection of the numeral operator 206 by the user may result in displaying a numerical keyboard to the user and the user may then choose a number of digital image frames to be captured using the first capture parameter value. In an embodiment, the first capture parameter value along with the first number of digital image frames configure the first camera setting input.

In an embodiment, the first interactive display 200 is further configured to display a sequencing operator 208 configured to facilitate, upon user-selection, a provisioning of a second interactive display (explained later with reference to FIG. 4) to the user. The user-selection of the sequencing operator 208 is indicative of request to the apparatus for storing the first camera setting input in an image capture sequence or a queue and for presenting the second interactive display to further choose a second camera setting input, i.e. a second capture parameter value and a second number of digital image frames to capture using the second capture parameter value. The apparatus may be caused to store the first camera setting input and the second camera setting input as an image capture sequence in the memory 104. Upon receiving the second camera setting input, the apparatus may facilitate actuation of the image capture sequence by displaying an actuation operator, such as an actuation operator 210 displayed on the first interactive display 200. Upon user selection of the actuation operator 210, the apparatus may thereafter cause the digital camera to capture the bracketing sequence of digital image frames configured by the image capture sequence. The capturing of the bracketing sequence of digital image frames is further explained with reference to an illustrative example:

A user may wish to capture an image of a scene and may not be sure of a suitable value of shutter speed to select for image-capture purposes. Accordingly, the user may invoke a first interactive display 200 to view adjustable setting (i.e. a slider interface element) for shutter speed capture parameter. The user may adjust the setting to '1/800', thereby provisioning the first capture parameter value and further select the first number of digital image frames using the numeral operator 206 to be one. It is understood the first capture parameter value (i.e. the '1/800' shutter speed setting) and the first number of digital image frames (i.e. one digital image frame) configure the first camera setting input. The apparatus may further enable the user to manually build an image capture sequence by using the sequencing operator 208. A second interactive display may be displayed to the user upon selection of the sequencing operator 208 for enabling the user to provide a second camera setting input (for example, a second capture parameter value, i.e. '1/1600' shutter speed setting, and a second number of digital image frames, for example one, to capture using the second capture parameter value). An actuation of the image capture sequence by using the actuation operator 210 by the user may facilitate a capture of bracketing sequence of digital image frames, i.e. two digital image frames, one with 1/800 shutter speed setting and another with 1/1600 shutter speed setting. It is understood that the image capture sequence including only the first camera setting input and the second camera setting input is described herein for illustrative purposes and that the user may configure the image capture sequence to include a third camera setting input, a fourth camera setting input and so on and so forth (for example, in order to capture the desired image with even more setting variations of shutter speed). It is also understood that the first interactive display 200 is depicted to display adjustable settings for only one capture parameter for illustration purposes and that the first interactive display 200 may display adjustable settings for two or more capture parameters and the first camera setting input may, in that case, include at least one first capture parameter value and a first number of digital image frames to be captured using the at least one first capture parameter value as will be explained with reference to FIG. 3.

Figure 3:
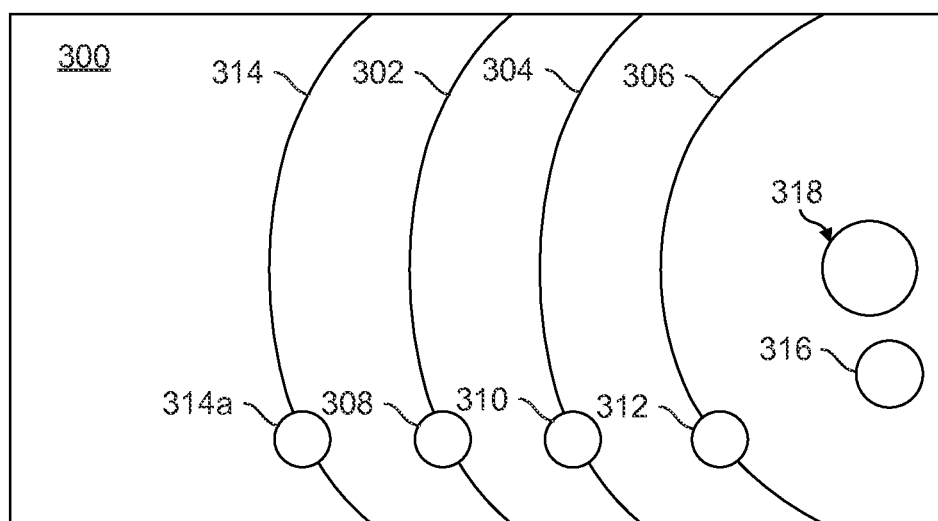
FIG. 3 is a diagram illustrating an example representation of a first interactive display presented to a user, in accordance with another example embodiment.

FIG. 3 is a diagram illustrating an example representation of a first interactive display 300 presented to a user, in accordance with another example embodiment. As explained with reference to FIG. 2, an apparatus, such as the apparatus 100 may present a first interactive display, such as the first interactive display 300 to the user upon receiving an input indicative of the user's desire to adjust settings of one or more capture parameters associated with a digital camera, such as the digital camera 108. Further, as explained with reference to FIG. 2, a first interactive display is configured to display adjustable settings corresponding to least one capture parameter to enable the user to adjust the settings of the at least one capture parameter. In FIG. 3, the first interactive display 300 is depicted to exemplarily display a first slider interface element 302 configured to enable the user to adjust setting for a first capture parameter; a second slider interface element 304 configured to enable the user to adjust setting for a second capture parameter (different than the first capture parameter); a third slider interface element 306 configured to enable the user to adjust setting for a third capture parameter (different than the first capture parameter and the second capture parameter). It is understood that the first, second and third capture parameters may correspond to different camera capture parameters, such as exposure compensation, white balance, ISO, shutter speed, delay, zoom, aperture, flash, flash color temperature and the like. Moreover, it is noted that various values of the capture parameter settings are associated with various positions along the contour of the linear shape of the respective slider interface elements.

The first interactive display 300 also displays a selection point corresponding to each slider interface element. For example, the first slider interface element 302 is associated with a selection point 308; the second slider interface element 304 is associated with a selection point 310; and the third slider interface element 306 is associated with a selection point 312. Each selection point from among the selection points 308, 310 and 312, may be utilized in conjunction with their respective slider interface elements as explained with reference to FIG. 2. More specifically, the selection points 308, 310 and 312, may be utilized in conjunction with their respective slider interface elements such a position of a selection point along the contour of a slider interface element may identify a value associated with the setting. The first interactive display 300 further displays an additional slider interface element 314 with a corresponding selection point 314*a*. The additional slider interface element 314 along with the selection point 314*a*, together, serve as a numeral operator for receiving user input corresponding to a first number of digital image frames to be captured using the chosen settings for the first, second and third capture parameters. It is understood that various positions along the curvilinear contour of the additional slider interface element 314 may correspond to numerical values (such as for example, one, two, three and so on and so forth) for facilitating the user to input, using the selection point 314*a*, the first number of digital image frames to be captured using the chosen settings. Further, it is noted that though a numeral operator is depicted to be a clickable operator in FIGS. 4, 6A, 6B, 7A, 7B and 8A to 8H, in many embodiments, the numeral operator may be configured as a slider interface element, such as the slider interface element 314, along with a corresponding selection point, such as the selection point 314*a*, to receive user input corresponding to a number of digital image frames to be captured using the chosen settings.

The user may adjust settings for at least one capture parameter (for example, for exposure compensation or brightness, focus, white balance and the like) from among the first, second and third capture parameters, thereby providing input corresponding to at least one first capture parameter value. For example, if two capture parameters, such as shutter speed and exposure compensation, are presented to the user on the first interactive display 300 and the user adjusts the setting of flash to 'ON', while retaining the 'auto' setting for exposure compensation, then the chosen setting for shutter speed and exposure compensation configure the first capture parameter values. Upon provisioning the at least one first capture parameter value, the user may utilize the numeral operator (i.e. the additional slider interface element 314 and the selection point 314*a*) to provide an input for a first number of digital image frames to be captured using first capture parameter values. As explained with reference to FIG. 2, a numeral operator is configured to display a "1" numeral by default indicative of a minimum number of digital image frames to be captured using the at least one first capture parameter value to be one. In an embodiment, the user may increase the number of digital image frames to be captured using the at least one first capture parameter value by providing, for example, a drag input equivalent to a number of digital image frames desired to be captured. In an embodiment, user input related to the at least one first capture parameter value along with the first number of digital image frames configure the first camera setting input.

The first interactive display 300 further displays a sequencing operator 316, which upon user-selection is configured to facilitate a provisioning of a second interactive display (explained with reference to FIG. 4) to the user. As explained with reference to FIG. 2, the user-selection of a sequencing operator is indicative of request to the apparatus for storing the first camera setting input in an image capture sequence or a queue and for presenting the second interactive display to further choose a second camera setting input, i.e. at least one second capture parameter value and a second number of digital image frames to capture using the second capture parameter value. The apparatus may be caused to store the first camera setting input and the second camera setting input as the image capture sequence in memory, such as the memory 104 of FIG. 1. Upon receiving the second camera setting input, the apparatus may facilitate actuation of the image capture sequence by displaying an actuation operator, such as an actuation operator 318 displayed on the first interactive display 300. The apparatus may thereafter cause the digital camera to capture the bracketing sequence of digital image frames configured by the image capture sequence. The second interactive display is further explained with reference to FIG. 4.

Figure 4:
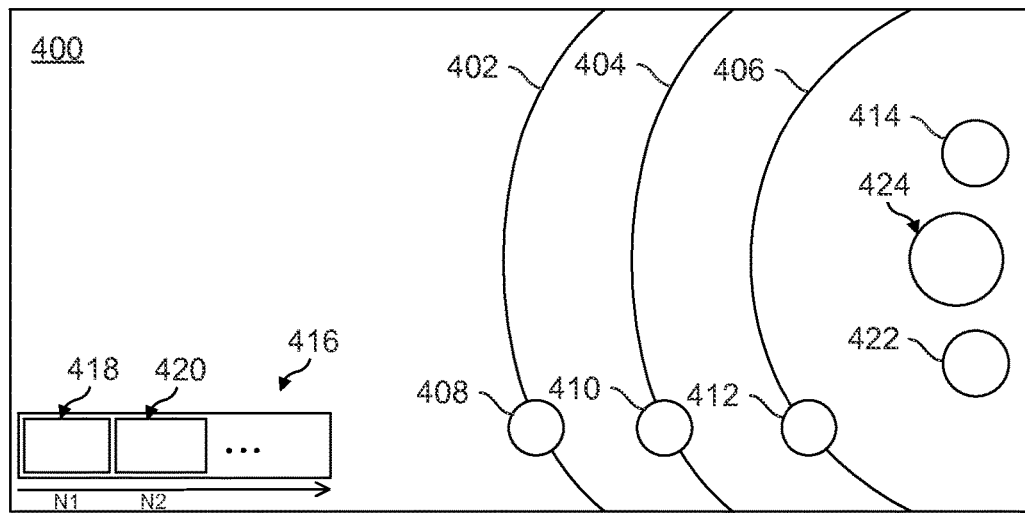
FIG. 4 is a diagram illustrating an example representation of a second interactive display presented to a user, in accordance with an example embodiment.

FIG. 4 is a diagram illustrating an example representation of a second interactive display 400 presented to a user, in accordance with another example embodiment. As explained with reference to FIG. 2 and FIG. 3, an apparatus, such as the apparatus 100 may present a second interactive display, such as the second interactive display 400 to the user upon receiving a user selection of a sequencing operator (such as the sequencing operator 208 depicted in FIG. 2 or the sequencing operator 316 depicted in FIG. 3). Further, the selection of the sequencing operator is indicative of user intent to manually define an image capture sequence, which may be utilized to facilitate capturing of a bracketing sequence of digital image frames.

The second interactive display 400 is depicted to exemplarily display a first slider interface element 402 configured to enable the user to adjust setting for a first capture parameter; a second slider interface element 404 configured to enable the user to adjust setting for a second capture parameter (different than the first capture parameter); a third slider interface element 406 configured to enable the user to adjust setting for a third capture parameter (different than the first capture parameter and the second capture parameter).

Further, the second interactive display 400 is further configured to display a selection point to be associated with each slider interface element. For example, the first slider interface element 402 is associated with a selection point 408; the second slider interface element 404 is associated with a selection point 410; and the third slider interface element 406 is associated with a selection point 412. The selection points 408, 410 and 412, may be utilized in conjunction with their respective slider interface elements as explained with reference to FIG. 2. More specifically, the selection points 408, 410 and 412, may be utilized in conjunction with their respective slider interface elements such that a position of a selection point along the contour of a slider interface element may identify a value associated with the setting. The user may adjust settings of at least one capture parameter from among the first, second and third capture parameters. More specifically, the user chooses at least one second capture parameter value using the adjustable settings corresponding to the first, second and third capture parameters.

The second interactive display 400 further displays a numeral operator 414 configured to receive user input indicating a second number of digital image frames to be captured using the at least one second capture parameter value. It is understood that the numeral operator 414 is depicted as a clickable operator on the second interactive display 400 for illustrative purposes, and, in at least one example embodiment, the numeral operator 414 may be embodied as a slider interface element with a corresponding selection point as explained with reference to the additional slider interface element 314 and the selection point 314a in FIG. 3. In at least one example embodiment, user input related to the at least one second capture parameter value and the second number of digital image frames to be captured using the at least one second capture parameter value configure the second camera setting. Moreover, the second camera setting may be stored in a memory (such as the memory 104 explained with reference to FIG. 1) along with the first camera setting input to configure an image capture sequence. In at least one embodiment, the apparatus 100 is caused to display the so-formed image capture sequence on the second interactive display 400 as depicted by the block 416. The block 416 captures user-selection of the settings as depicted in sub-blocks 418 and 420, respectively, and a number of digital image frames to capture corresponding to each of the first camera setting input and the second camera setting input such as for example, 'N$_1$' digital image frames for the first camera setting input and 'N$_2$' digital image frames for the second camera setting input. The user may view the image capture sequence being displayed in an on-going manner and may take any corrective action if needed prior to actuating capture of the bracketing sequence of digital image frames.

The second interactive display 400 further displays a sequencing operator 422 configured to facilitate display of a third interactive display and an addition of a third camera setting input to the image capture sequence. It is understood that if the user chooses to add one or more camera settings inputs, then the subsequent interactive displays (such as for example, a third interactive display, a fourth interactive display and so on and so forth) may display the image capture sequence to include information related to the chosen settings for each set of camera settings input provided till that point in time. The second interactive display further displays an actuation operator 424 configured to cause the digital camera to capture the bracketing sequence of digital image frames configured by the image capture sequence.

In at least one example embodiment, the first interactive display and the second interactive display may be configured to display adjustable settings for at least two different capture parameters and facilitate manual building of an image capture sequence while precluding a numeral operator. One such example embodiment is explained with reference to FIG. 5.

Figure 5:
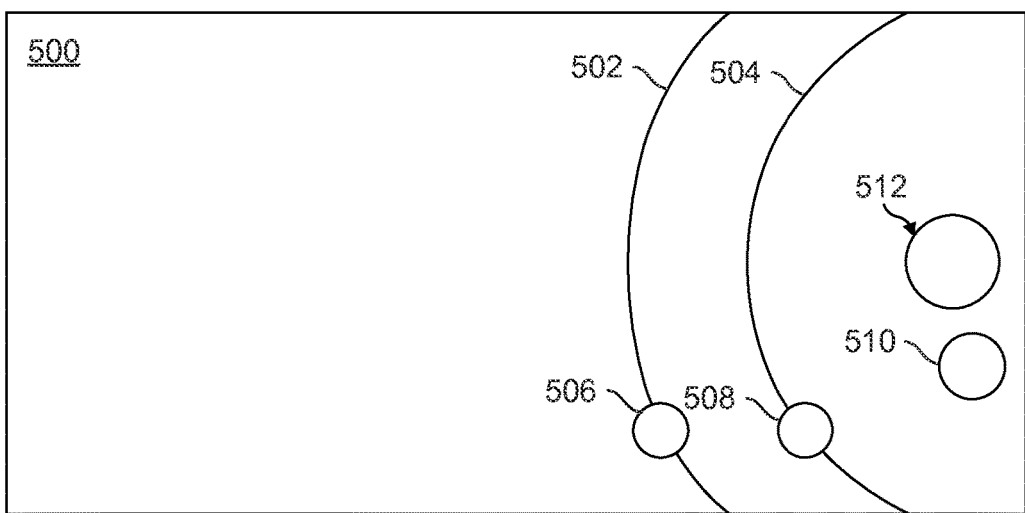
FIG. 5 is a diagram illustrating an example representation of a first interactive display displaying adjustable settings for at least two different capture parameters to a user, in accordance with an example embodiment.

FIG. 5 is a diagram illustrating an example representation of a first interactive display 500 displaying adjustable settings for two different capture parameters to a user, in accordance with an example embodiment. The first interactive display 500 is depicted to exemplarily display a first slider interface element 502 configured to enable the user to adjust setting for a first capture parameter and a second slider interface element 504 configured to enable the user to adjust setting for a second capture parameter (different than the first capture parameter). Further, the second interactive display 500 is further configured to display a selection point to be associated with each slider interface element. For example, the first slider interface element 502 is associated with a selection point 506 and the second slider interface element 504 is associated with a selection point 508. The selection points 506 and 508, may be utilized in conjunction with their respective slider interface elements such that a position of a selection point along the contour of a slider interface element may identify a value associated with the setting. The user may adjust settings of the first and the second capture parameters. More specifically, the user chooses first capture parameter values using the adjustable settings corresponding to the first and the second capture parameters. The first interactive display 500 differs from the first interactive displays 200 and 300 explained with reference to FIGS. 2 and 3, respectively, in that the first interactive display 500 does not include a numeral operator for receiving user input corresponding to the first number of digital image frames. Accordingly, a number of digital image frames to be captured using the first capture parameter values may be a preset value (for example, one). In at least one example embodiment, the preset value corresponding to the number of digital image frames may be determined by an apparatus, such as the apparatus 100 or, at least in some embodiments, the apparatus may enable the user to define the preset value and store the preset value in the memory 104. Further, the first camera setting input, in this case, includes only the user input related to the first capture parameter values corresponding to the two different capture parameters. It is understood that the first interactive display 500 may display adjustable settings for two or more different capture parameters and, in that case, the first camera setting may include a value for at least two different capture parameters. A memory, such as the memory 104, may be configured to store the first camera setting input.

The first interactive display 500 further displays a sequencing operator 510, which upon user-selection is configured to facilitate a provisioning of a second interactive display to the user. As explained with reference to FIG. 2, the user-selection of a sequencing operator is indicative of request to the processor 102 for storing the first camera setting input in an image capture sequence or a queue and for presenting the second interactive display to further choose a second camera setting input, i.e. a value for at least two different capture parameters. The apparatus 100 may be caused to store the first camera setting input and the second camera setting input as the image capture sequence in the memory 104. In at least one embodiment, the apparatus 100 is caused to display the so-formed image capture sequence on the second interactive display as explained with reference to FIG. 4, while precluding information related to the number of images to be captured using the first camera setting input and the second camera setting input. The user may view the image capture sequence being displayed and may take any corrective action, if needed, prior to actuating capture of the bracketing sequence of digital image frames. Upon receiving the second camera setting input, the apparatus 100 may facilitate actuation of image capture sequence by displaying an actuation operator, such as an actuation operator 512, displayed on the first interactive display 500. The apparatus may thereafter cause a digital camera, such as the digital camera 108 of FIG. 1, to capture the bracketing sequence of digital image frames configured by the image capture sequence.

In an embodiment, the apparatus is caused to display, on a second interactive display, the adjustable settings corresponding to the at least one capture parameter such that capture parameter values displayed therein are associated with values relative to absolute values of respective capture parameter values displayed on a first interactive display. One such example embodiment is further explained with reference to FIGS. 6A and 6B.

Figure 6A:
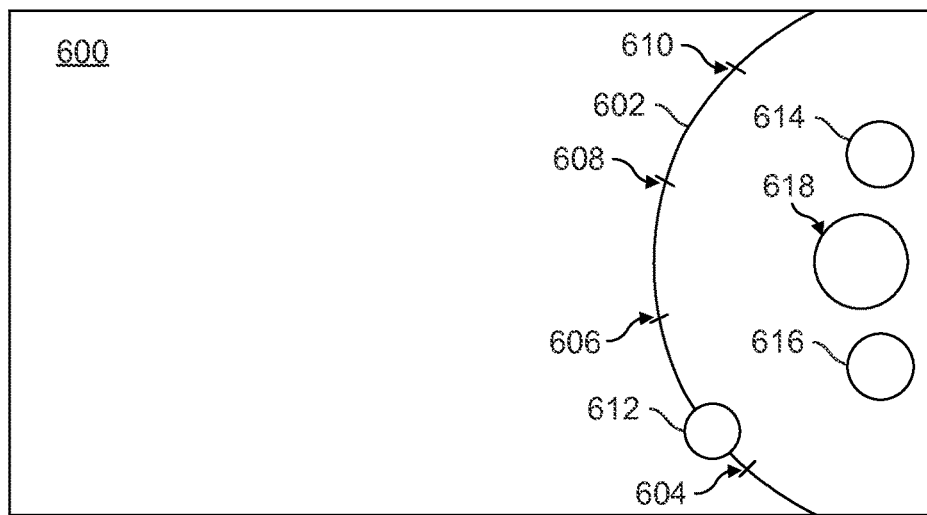
FIGS. 6A-6B are diagrams illustrating example representation of a first interactive display and a second interactive display, respectively, in accordance with an example embodiment.
Figure 6B:
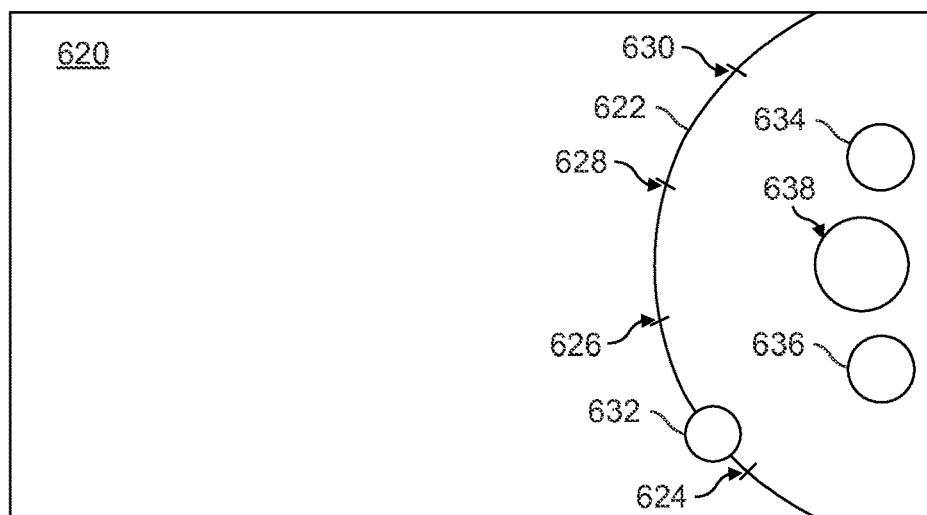

FIGS. 6A-6B are diagrams illustrating example representation of a first interactive display and a second interactive display, respectively, in accordance with another example embodiment. FIG. 6A is a diagram illustrating an example representation of a first interactive display 600 presented to the user in accordance with an example embodiment. The first interactive display 600 is configured to depict adjustable settings corresponding to only one capture parameter for exemplary purposes. It is understood that the first interactive display 600 may display adjustable settings for two or more different capture parameters to control image-capture by a digital camera, such as the digital camera 108 of FIG. 1. Accordingly, the first interactive display 600 depicts a slider interface element 602 related to a capture parameter from among a plurality of capture parameters included in the camera settings. As explained with reference to FIG. 2, each position on the curvilinear contour of the slider interface element 602 is associated with a capture parameter value corresponding to the capture parameter. For example, a slider interface element corresponding to the shutter speed capture parameter may depict capture parameters values ranging from $\frac{1}{1600}$ to 4 s and the like. In FIG. 6A, four capture parameter values, 604, 606, 608 and 610 associated with four positions on the slider interface element 602 are depicted for illustration purposes. For example, the four capture parameter values for a shutter speed camera setting may be '$\frac{1}{1600}$', '$\frac{1}{800}$', '$\frac{1}{400}$' and '$\frac{1}{200}$'.

The slider interface element 602 is further associated with a selection point 612 configured to facilitate user selection of a value from among a plurality of capture parameter values associated with various positions of the slider interface element 602. In an illustrative example, the selection point 612 may be dragged to at a position on the slider interface element 602 corresponding to the capture parameter value 608 (for example, '$\frac{1}{400}$' shutter speed camera setting). Upon selection of a capture parameter value from among the plurality of capture parameter values, the user may provide an input corresponding to a number of digital image frames to be captured using a numeral operator 614. The user may further select a sequencing operator 616 to initiate manual building of the image capture sequence as explained with reference to FIGS. 2, 3 and 4. In at least one embodiment, upon selection of the sequencing operator 616, a second interactive display may be presented to the user (as depicted in FIG. 6B) displaying capture parameter values in relation to absolute values of corresponding capture parameter values displayed on the first interactive display 600. It is noted that the first interactive display 600 also displays an actuation operator 618.

FIG. 6B is a diagram illustrating an example representation of a second interactive display 620 presented to the user upon user selection of the sequencing operator 616 displayed on the first interactive display 600 depicted in FIG. 6A, in accordance with an example embodiment. The second interactive display 620 further depicts a slider interface element 622 for enabling adjustment of settings for a capture parameter (such as the shutter speed camera setting) so as to aid the user to capture one or more images with a different capture parameter value than that chosen on the first interactive display 600. In at least one embodiment, the slider interface element 622 is configured to preclude absolute values and instead depict capture parameter values 624, 626, 628 and 630 relative to the capture parameter values 604, 606, 608 and 610 depicted in the first interactive display 600. For example, a slider interface element corresponding to the shutter speed camera setting is configured to depict capture parameter values as '25%', '50%', '100%' and '200%' corresponding to capture parameters values '$\frac{1}{1600}$', '$\frac{1}{800}$', '$\frac{1}{400}$', '$\frac{1}{200}$' displayed on the first interactive display 600, respectively. In at least one example embodiment, a technical effect associated with such a display of relative capture parameter values may be to enable the user quantify an effect of different values of a capture parameter on image-quality more easily. The slider interface element 622 is further associated with a selection point 632 configured to facilitate user selection of a relative value from among a plurality of capture parameter values associated with various positions of the slider interface element 622. It is noted that the second interactive display 620 also displays a numeral operator 634, a sequencing operator 636 and an actuation operator 638. The numeral operator 634, the sequencing operator 636 and the actuation operator 638 may perform functions similar to those described with reference to corresponding elements in FIG. 4 and are not explained again herein. It is also understood that the second interactive display 620 may display an image capture sequence, such as the image capture sequence 416 depicted on the second interactive display 400 in FIG. 4.

Figure 7A:
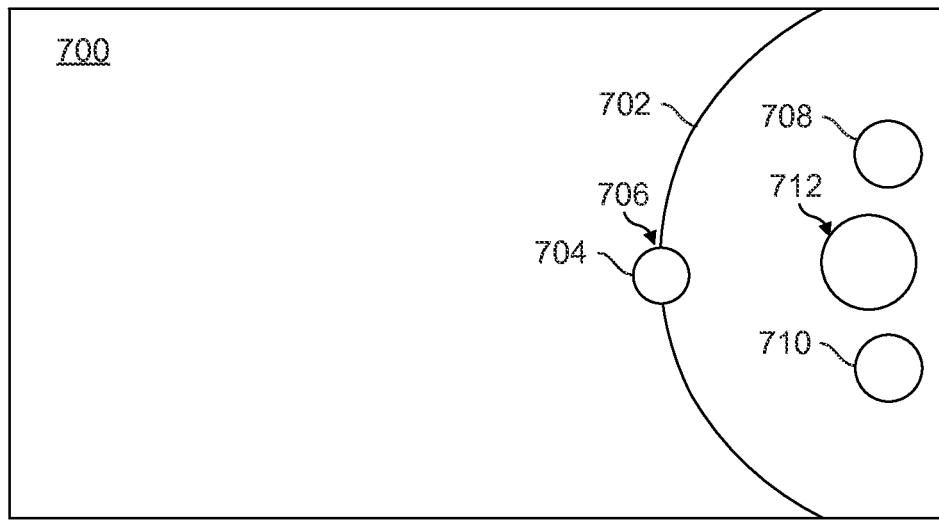
FIGS. 7A-7B are diagrams illustrating example representation of a first interactive display and a second interactive display, respectively, in accordance with another example embodiment.
Figure 7B:
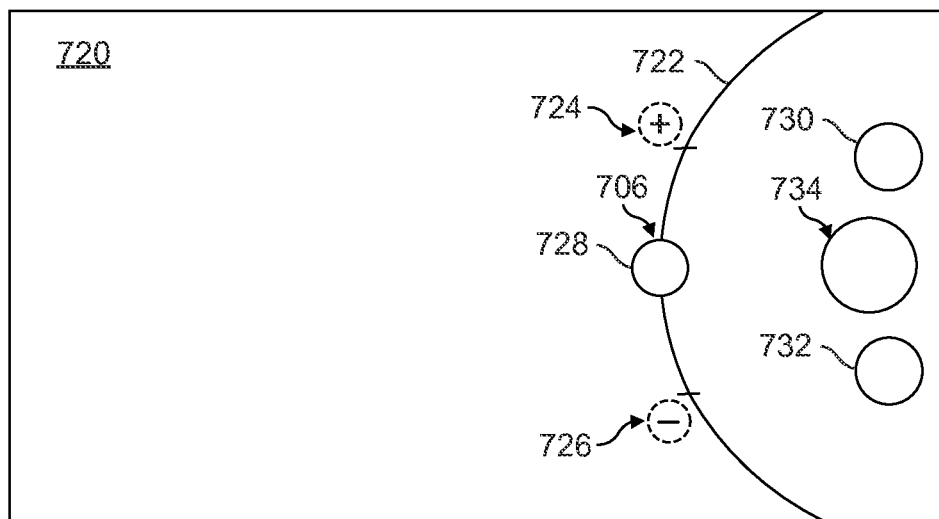

FIGS. 7A-7B are diagrams illustrating example representation of a first interactive display and a second interactive display, respectively, in accordance with another example embodiment. FIG. 7A is a diagram illustrating an example representation of a first interactive display 700 presented to the user in accordance with an example embodiment. The first interactive display 700 is configured to depict adjustable setting corresponding to only one capture parameter for exemplary purposes. It is understood that the first interactive display 700 may display adjustable settings for two or more different capture parameters to control image-capture by a digital camera, such as the digital camera 108 of FIG. 1. Accordingly, the first interactive display 700 depicts a slider interface element 702 related to a capture parameter from among a plurality of capture parameters included in the camera settings. As explained with reference to FIG. 2, each position on the curvilinear contour of a slider interface element is associated with a capture parameter value corresponding to the capture parameter. The slider interface element 702 is further associated with a selection point 704 configured to facilitate user selection of a value from among a plurality of capture parameter values associated with various positions of the slider interface element 702.

In at least one embodiment, each capture parameter in camera settings stored in a memory, such as the camera settings 112 stored in the memory 104, is associated with an automatic setting (hereinafter also interchangeably referred to as 'auto', 'auto setting' or 'auto setting value'). The automatic setting is configured to facilitate automatic selection of a capture parameter value from among a plurality of capture parameter values associated with the capture parameter, where the selected captured parameter value is determined (for example, by the processor 102 of the apparatus 100 explained with reference to FIG. 2) to be suitable for a current imaging environment. The term 'current imaging environment' as included herein refers to one or more environmental conditions associated with a scene being viewed in a viewfinder mode of a display associated with a user interface. For instance, in an example scenario, the scene may be captured in daylight or with artificial lighting. In another example scenario, the scene being captured may include moving elements (for example, moving vehicles, flowing water, flying birds, running people etc.) or may include still objects. In yet another scenario, the scene being captured may be associated with inordinate amount of brightness on account of including shining objects or reflective elements (for example, water related elements or snow being viewed in sunlight, glass related objects etc.). Accordingly, the current imaging environment may be associated with various aspects that may affect a quality of the captured image, and an apparatus, such as the apparatus 100, may be configured to determine the most suitable setting, i.e. an automatic setting for each capture parameter given the current imaging environment so as to enable the user to capture the best digital image frame for the scene while precluding the need on the user's behalf to identify the most suitable setting for each capture parameter. In FIG. 7A, the user is depicted to have adjusted the selection point 704 on the slider interface element 702 to select an auto setting value 706 for the capture parameter. Upon selection of the auto setting value 706, the user may provide an input corresponding to a number of digital image frames to be captured using a numeral operator 708. The user may further select a sequencing operator 710 to initiate manual building of the image capture sequence as explained with reference to FIGS. 2, 3 and 4. In at least one embodiment, upon selection of the sequencing operator 710, a second interactive display may be presented to the user (as depicted in FIG. 7B) displaying options for incrementing and decrementing a value of a capture parameter from the auto setting value. A second interactive display displaying options for incrementing and decrementing the value of the capture parameter from the auto setting value is further explained with reference to FIG. 7B. It is noted that the first interactive display 700 also depicts an actuation operator 712.

FIG. 7B is a diagram illustrating an example representation of a second interactive display 720 presented to the user upon user selection of the sequencing operator 710 displayed on the first interactive display 700 depicted in FIG. 7A, in accordance with an example embodiment. The second interactive display 720 further depicts a slider interface element 722 for enabling adjustment of settings for a capture parameter so as to aid the user to capture one or more digital image frames with a different capture parameter value than the auto setting value 706 selected on the first interactive display 700. In at least one embodiment, the slider interface element 722 is configured to display an option, for example an option 724 depicting a '+' (or positive) sign, configured to increment the capture parameter value from the auto setting value by a predefined factor for example '2×' or 2 times, and an option, for example, an option 726 depicting a '−' (or negative) sign configured to decrement the capture parameter value from the auto setting value by a predefined factor for example '½×' or half of the auto setting value. In at least one example embodiment, a technical effect associated with such a display of options may be to visually simplify a bracketing iteration for the user and discern the affect of the user's choice in the captured images more easily. The slider interface element 722 is further associated with a selection point 728 configured to facilitate user selection of an option for incrementing or decrementing the capture parameter value from the auto setting value. It is noted that the second interactive display 720 also displays a numeral operator 730, a sequencing operator 732 and an actuation operator 734. The numeral operator 730, the sequencing operator 732 and the actuation operator 734 may perform functions similar to those described with reference to corresponding elements in FIG. 4 and are not explained again herein. It is also understood that the second interactive display 720 may display an image capture sequence, such as the image capture sequence 416 depicted on the second interactive display 400 in FIG. 4.

Figure 8A:
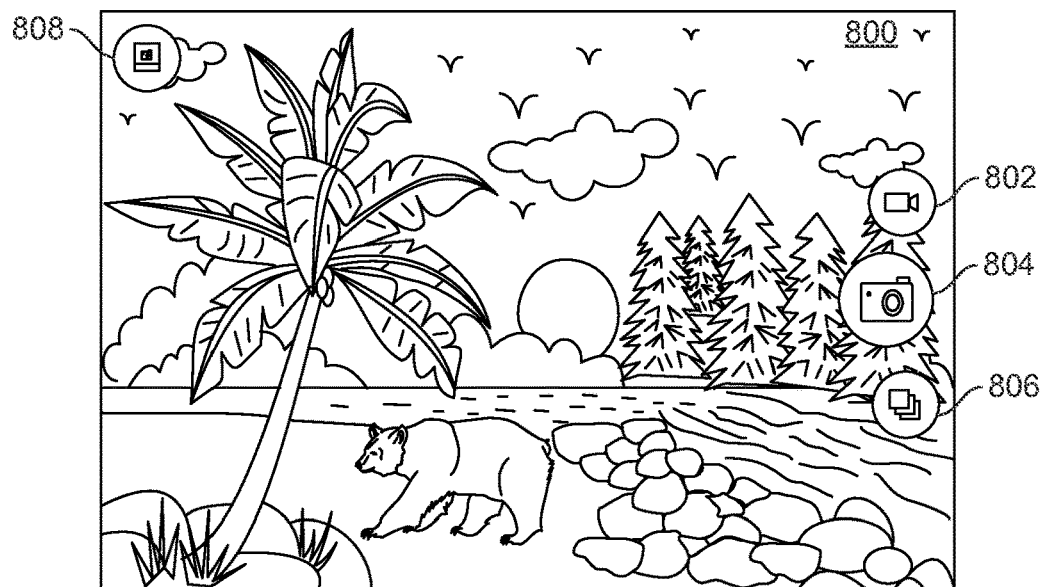
FIGS. 8A-8H are diagrams illustrating example representation of a process flow for capturing a bracketing sequence of digital image frames corresponding to a scene, in accordance with an embodiment.

FIGS. 8A-8H are diagrams illustrating example representation of a process flow for capturing a bracketing sequence of digital image frames corresponding to a scene, in accordance with an embodiment. In many example scenarios, a user may invoke a viewfinder mode of a digital camera to capture a scene. FIG. 8A is a diagram depicting a display region 800 associated with a user interface (such as the user interface 106 explained with reference to FIG. 1) displaying a natural wildlife scene upon invoking the viewfinder mode associated with a digital camera, such as the digital camera 108 of FIG. 1.

The display region 800 is depicted to exemplarily display an actuation mode selector 802, an actuation operator 804, an image gallery actuator 806 and a settings operator 808. In at least one embodiment, the actuation mode selector 802 is configured to facilitate user-selection of an actuation mode from among an image capture mode, a video capture mode and a high dynamic range (HDR) image capture mode. The actuation operator 804 is configured to display the selected actuation mode and further enable the user to initiate actuation of an operation related to the selected actuation mode. In FIG. 8A, an image capture mode is depicted to be selected by the user, and accordingly, the actuation operator 804 is configured to display 'a camera icon' representing the image capture mode. The user may provide an input related to the actuation operator 804 (for example, by providing touch-input or by selecting the displayed actuation operator 804 using any other input means) to initiate actuation of image capture by the digital camera.

Figure 8B:
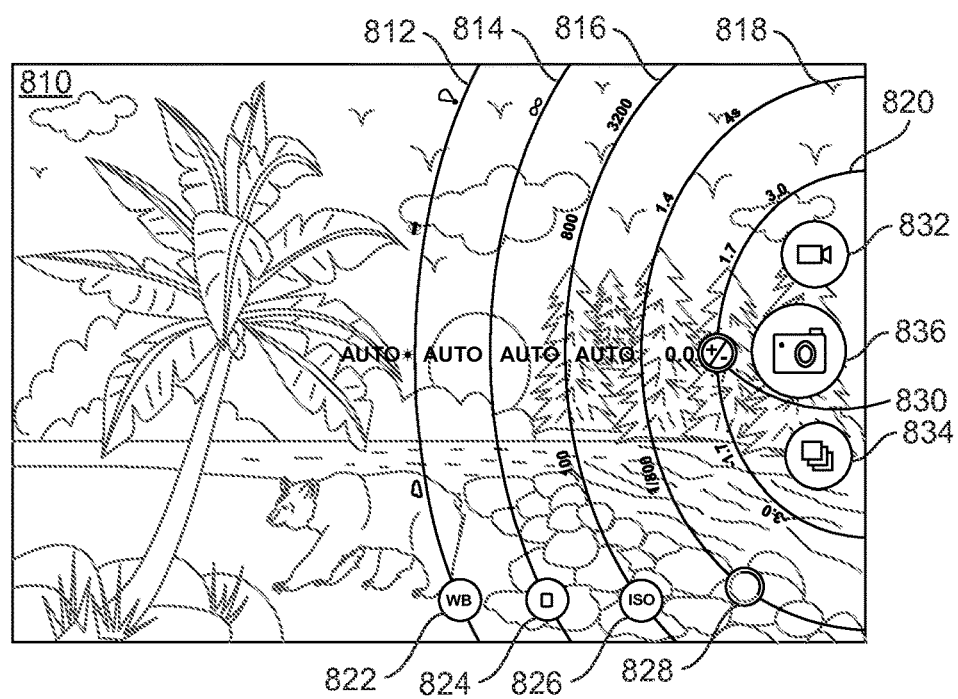

In at least one example embodiment, the image gallery actuator 806 is configured to display an icon-based (or a listing-based) preview of digital image frames captured using the digital camera. In at least one example embodiment, the settings operator 808 is configured to display a list of options for accessing 'settings options' corresponding to the camera settings associated with the digital camera. In at least one example embodiment, an option from among a plurality of options displayed upon user-selection of the settings operator 808 may result in invoking a first interactive display 810 as depicted in FIG. 8B. It is understood that a manner of invoking of the first interactive display 810 may not be limited to the illustrative example explained herein and indeed the first interactive display 810 may be invoked in a number of different ways. For instance, in an illustrative example, the user may swipe across the display region 800 to invoke the first interactive display 810 from the viewfinder mode.

Referring now to FIG. 8B, a diagram illustrating an example representation of the first interactive display 810 is depicted, in accordance with an example embodiment. The first interactive display 810 displays slider interface elements 812, 814, 816, 818 and 820 corresponding to capture parameters related to white balance, focus, ISO, shutter speed and exposure compensation, respectively. Each slider interface element displayed on the first interactive display 810 is associated with a selection point configured to facilitate user selection of a capture parameter value from among a plurality of capture parameter values associated with a plurality of positions on the slider interface elements. For example, slider interface elements 812, 814, 816, 818 and 820 are associated with selection points 822, 824, 826, 828 and 830, respectively.

The slider interface element 812 is depicted to be associated with a plurality of capture parameter values configured to facilitate removing unrealistic color impression on objects, so that objects which appear white in person are rendered white in a captured digital image frame. Some exemplary capture parameter values displayed on the slider interface element 812 relate to a current lighting condition, such as for example lighting conditions such as 'cloudy', 'daylight', 'incandescent' and 'fluorescent'. The slider interface element 814 corresponding to the focus capture parameter is depicted to be associated with a plurality of capture parameter values for determining optimum range from the digital camera till which objects present therein are reproduced clearly. An exemplary capture parameter value displayed on the slider interface element 814 is 'infinity' (implying a user may select a capture parameter value for the focus parameter from a minimum preset value, such as 15 cm range, to infinity).

The slider interface element 816 corresponding to the ISO capture parameter is depicted to be associated with a plurality of capture parameter values corresponding to various light related sensitivity values associated with an image sensor of the digital camera. Some exemplary capture parameter values displayed on the slider interface element 816 are '100', '800' and '3200'. The slider interface element 818 corresponding to the shutter speed capture parameter (i.e. 'exposure time' related capture parameter) is depicted to be associated with a plurality of capture parameter values corresponding to various values for a length of time a shutter of the digital camera is open when capturing a digital image frame. Some exemplary capture parameter values displayed on the slider interface element 818 are '1/800', '1.4' and '4's.

The slider interface element 820 associated with the exposure compensation capture parameter (i.e. brightness related capture parameter) is depicted to be associated with a plurality of capture parameter values corresponding to various values for adjusting/compensating brightness in an captured digital image frame. Some exemplary capture parameter values displayed on the slider interface element 820 are '−3.0', '−1.7', '0.0', '1.7' and '3.0'. In FIG. 8B, an auto setting value is depicted to be selected for the 'white balance', 'focus', 'ISO' and 'shutter speed' capture parameters and '0.0' capture parameter value is selected for an exposure compensation capture parameter. The first interactive display 810 is further configured to depict a numeral operator 832, a sequencing operator 834 and an actuation operator 836. The numeral operator 832, the sequencing operator 834 and the actuation operator 836 are configured to perform functions as explained with reference to numeral operator, sequencing operator and an actuation operator explained with reference to FIGS. 2 to 5 and are not explained herein.

Figure 8C:
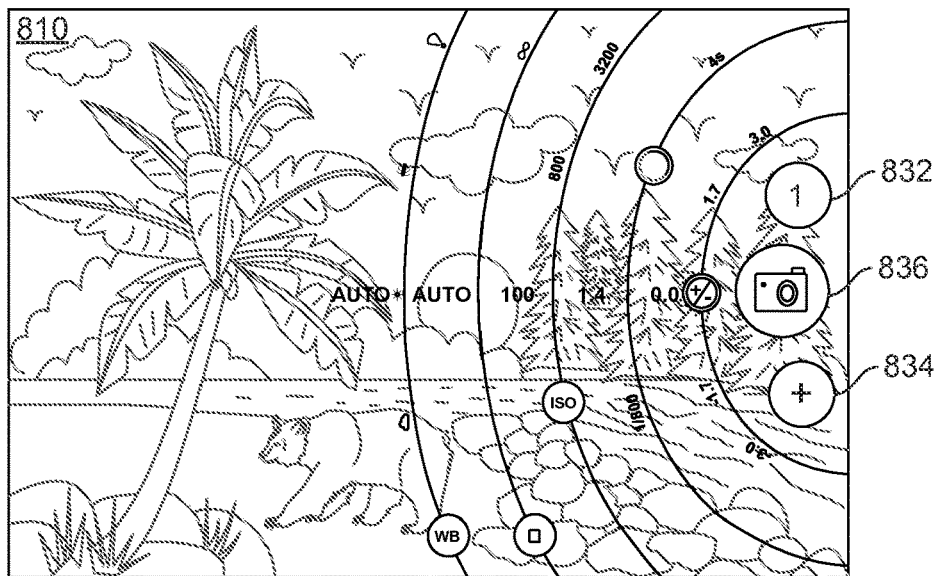

FIG. 8C depicts a snapshot view of the first interactive display 810 subsequent to user input for adjusting settings, via respective selection points, for capture parameters ISO and shutter speed. More specifically, selection points are dragged along contours of respective slider interface elements for the capture parameters ISO and shutter speed to reflect a capture parameter value of '100' for ISO and '1.4's for shutter speed capture parameters. An auto setting value is depicted to be selected for the 'white balance' and 'focus' capture parameters and '0.0' capture parameter value is selected for an exposure compensation capture parameter. Further, a number of digital image frames to be captured using the displayed captured values may be provisioned by the user using the numeral operator 832. In FIG. 8C, the user is depicted to have chosen a value of the number of digital image frames to be captured using the chosen settings to be one. The user may thereafter select the sequencing operator 834 (depicted as a "+" plus in FIG. 8C) in order to invoke a second interactive display for provisioning next batch of settings to the digital camera. It is noted that the chosen settings by the user for the various capture parameters on the first interactive display 810 and the number of digital image frames to capture using the chosen settings configure the first camera setting input. Further, as explained with reference to FIG. 2, a selection of a sequencing operator is indicative of the user's desire to manually build an image capture sequence (or a queue). Accordingly, the first camera setting input is stored in a memory, such as the memory 104 of FIG. 1, as a part of the image captures sequence. The second interactive display invoked upon selection of the sequencing operator 834 is depicted in FIG. 8D.

Figure 8D:
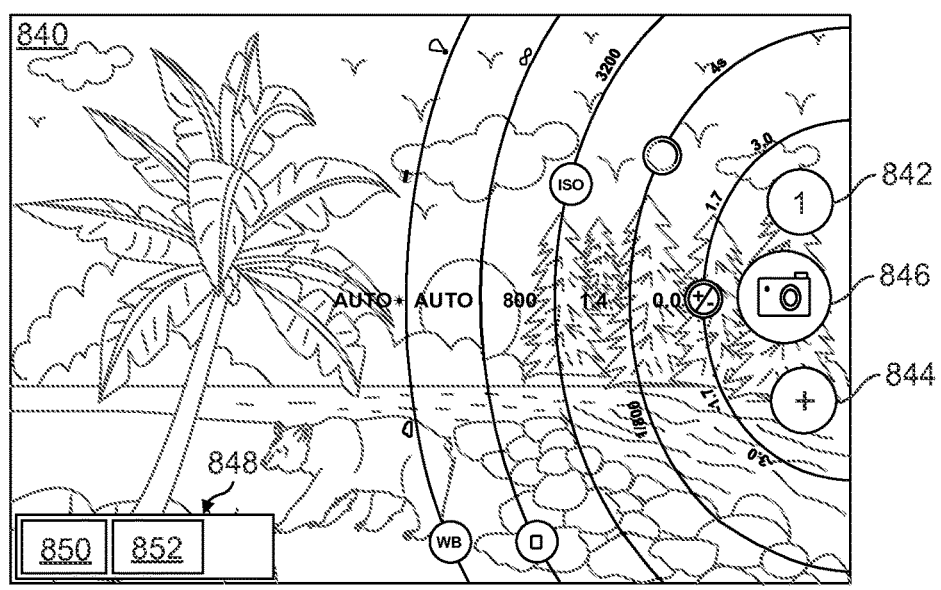
Figure 8E:
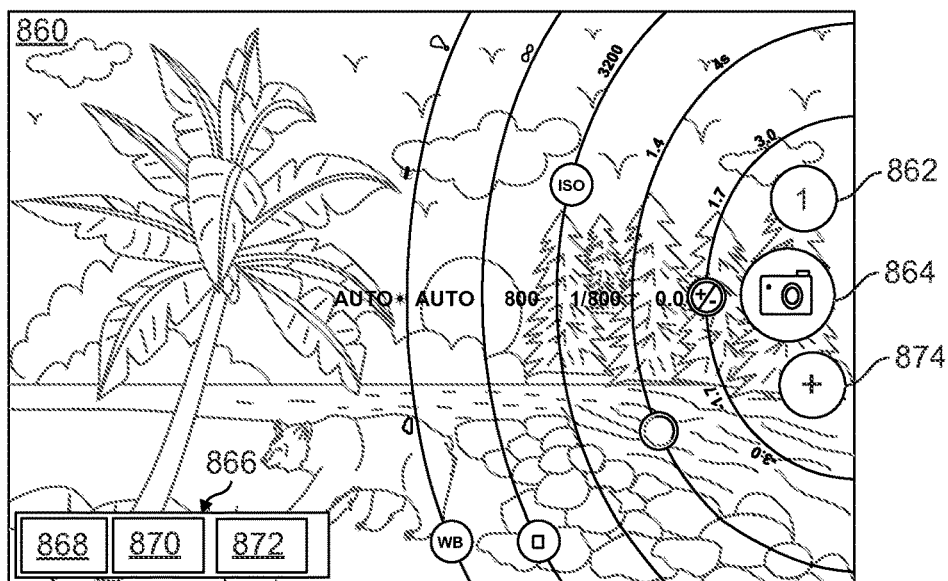

FIG. 8D depicts a snapshot view of a second interactive display 840 subsequent to user input for adjusting setting, via respective selection point, for capture parameter ISO while retaining selected values for remaining capture parameters on the first interactive display 810. More specifically, a selection point is dragged along contour of a respective slider interface element for the capture parameter ISO to reflect a capture parameter value of '800'. The capture parameter value for the shutter speed capture parameter is retained at '1.4's while an auto setting value is depicted to be selected for the 'white balance' and 'focus' capture parameters and '0.0' capture parameter value is selected for an exposure compensation capture parameter. Further, a number of digital image frames to be captured using the displayed capture parameter values may be provisioned by the user using a numeral operator 842. In FIG. 8C, the user is depicted to have chosen a value of the number of digital image frames to be captured using the chosen settings to be one. The user may thereafter select a sequencing operator 844 in order to invoke a third interactive display for provisioning next batch of settings to the digital camera. As explained with reference to FIG. 2, the chosen settings by the user for the various camera settings on the second interactive display 840 and the number of digital image frames to capture using the chosen camera settings configure the second camera setting input. The second interactive display 840 may also depict an image capture sequence as exemplarily depicted by block 848 displaying the first camera setting input and the second camera setting input as sub-blocks 850 and 852, respectively. The third interactive display invoked upon selection of the sequencing operator 844 is depicted in FIG. 8E. It is noted that the second interactive display 840 also displays an actuation operator 846.

Referring now to FIG. 8E, a snapshot view of a third interactive display 860 subsequent to user input for adjusting setting, via respective selection point, for capture parameter shutter speed is depicted. More specifically, a selection point is dragged along contour of a respective slider interface element for the capture parameter shutter speed to reflect a capture parameter value of '1/800'. The capture parameter value for the capture parameter ISO is retained at '800' while an auto setting value is depicted to be selected for the 'white balance' and 'focus' capture parameters and '0.0' capture parameter value is selected for an exposure compensation capture parameter. Further, a number of digital image frames to be captured using the displayed capture parameter values may be provisioned by the user using a numeral operator 862. In FIG. 8E, the user is depicted to have chosen a value of the number of digital image frames to be captured using the chosen settings to be one. It is noted that the chosen settings by the user for the various capture parameters on the third interactive display 860 and the number of digital image frames to capture using the chosen settings configure the third camera setting input. The user may thereafter select an actuation operator 864 to indicate completion of input into the image capture sequence and further actuate capture of a bracketing sequence of images based on the image capture sequence including the first, second and third camera setting inputs. The third interactive display 860 may also depict an image capture sequence as exemplarily depicted by block 866 displaying the first camera setting input, the second camera setting input and the third camera setting input as sub-blocks 868, 870 and 872, respectively. The third interactive display 860 also displays a sequencing operator 874 configured to perform functions as explained with reference to sequencing operators in FIGS. 2 to 5.

Figure 8F:
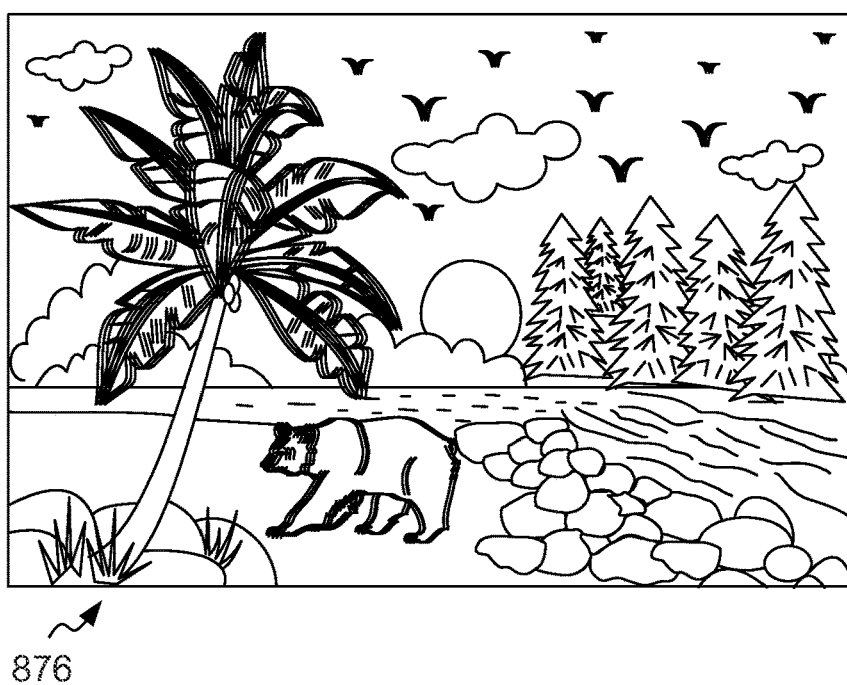
Figure 8G:
Figure 8H:
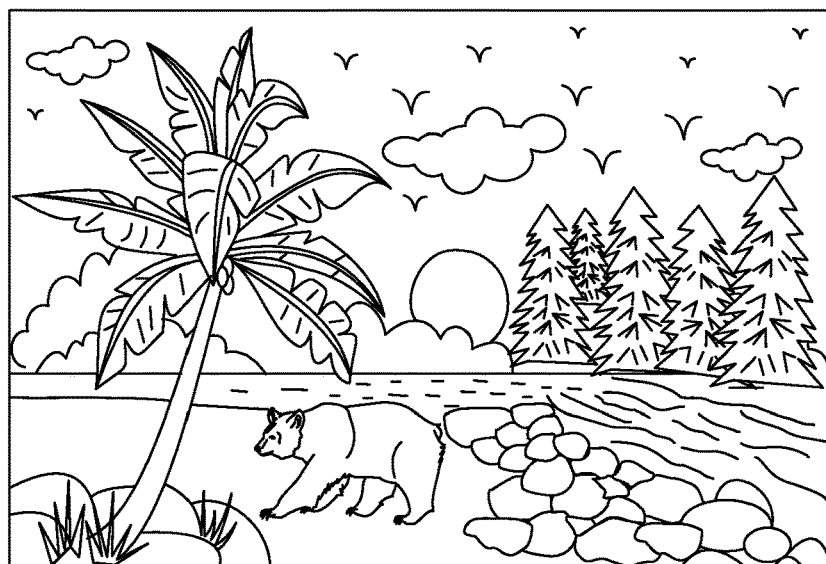

The captured digital image frames based on the so-formed image capture sequence of digital image frames are depicted in FIGS. 8F, 8G and 8H. More specifically, FIG. 8F depicts a digital image frame 876 captured based on the first camera setting input. FIG. 8G depicts a digital image frame 878 captured based on the second camera setting input and FIG. 8H depicts a digital image frame 880 captured based on the third camera setting input. The digital image frames 876, 878 and 880 configure the bracketing sequence of digital image frames captured corresponding to the scene. It can be observed that one or more objects/regions in the digital image frame 876 appear dark and blurred on account of insufficient light exposure to the image sensor and motion of objects in the scene. Further, it can be observed that one or more objects/regions in the digital image frame 878 appear substantially natural (i.e. not dark) but blurred upon adjustment to the ISO setting corresponding to the second camera setting input. Further, it can be observed that one or more objects/regions in the digital image frame 880 appear substantially natural and un-blurred upon adjustment of the shutter speed capture parameter setting corresponding to the third camera setting input. A user may compare the bracketing sequence of three digital image frames captured corresponding to the scene and may determine to retain the digital image frame 880 as it appears to capture the objects in the scene in the most natural manner.

It is noted that though interactive displays, such as the first interactive display 200, are depicted in a landscape orientation from FIGS. 2 to 8H, it is understood that rotating the apparatus in a counter-clockwise direction to reflect a portrait orientation has minimally discernable effect on one or more non-image components (for example, slider interface elements, selection points, numeral operators, sequencing operators, actuation operators etc.) displayed on the interactive displays. Moreover, one or more slider interface elements may be moved or dragged to another side of a display region, for example from a right side of the display region to a left side of the display region if one or more image objects being viewed are obstructed by the one or more slider interface elements. Furthermore, if a number of camera settings to be displayed on a display region are identified to cover a sizeable portion of the display region, then appropriate scrolling/swiping techniques may be introduced to present adjustable settings corresponding to the various capture parameters in a gradual manner.

Figure 9:
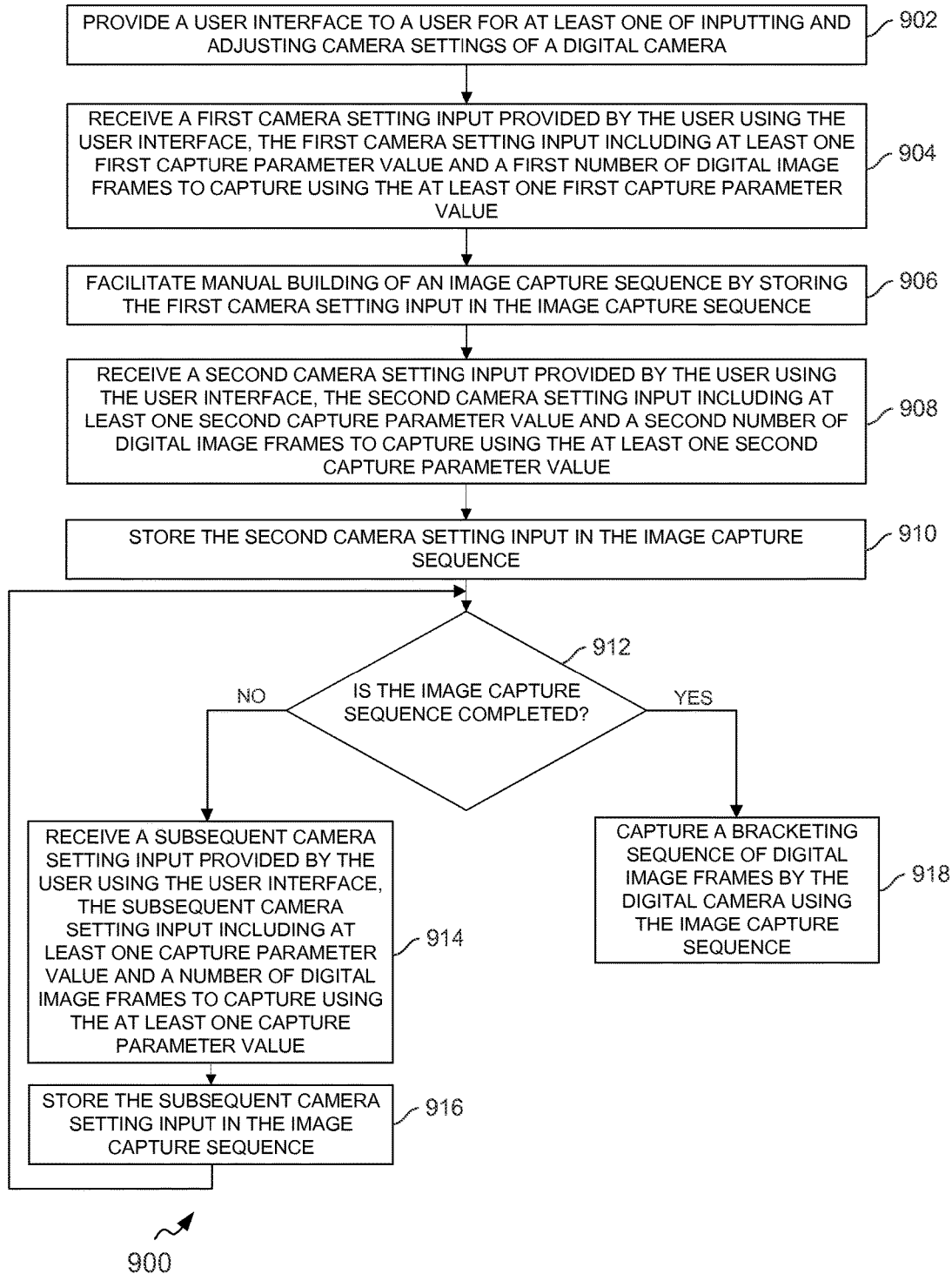
FIG. 9 illustrates an example flow diagram of a method for capturing a bracketing sequence of digital image frames, in accordance with an example embodiment.
Figure 10:
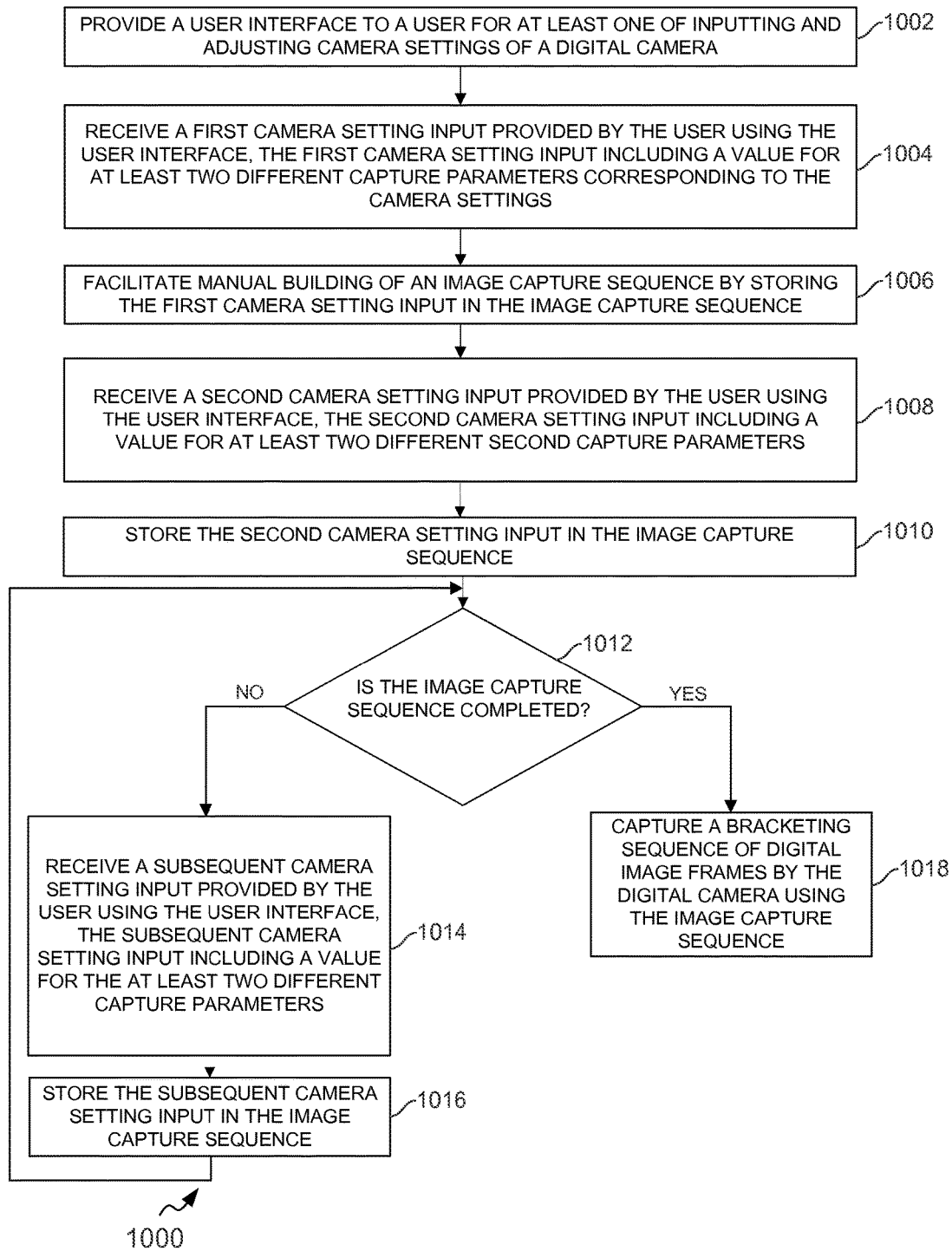
FIG. 10 illustrates an example flow diagram of a method for capturing a bracketing sequence of digital image frames, in accordance with another example embodiment.

Some example embodiments of methods of capturing a bracketing sequence of digital image frames are described herein with references to FIGS. 9 and 10. Any of the disclosed methods can be implemented using software comprising computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems can also be stored on one or more computer-readable media (e.g., non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

FIG. 9 illustrates an example flow diagram of a method 900 for capturing a bracketing sequence of digital image frames, in accordance with an example embodiment. Operations of the method 900 may be performed by, among other examples, by the apparatus 100 of FIG. 1.

At 902, the method 900 includes providing a user interface (e.g. the user interface 106 of FIG. 1) to a user for at least one of inputting and adjusting camera settings of a digital camera.

At 904, the method 900 includes receiving a first camera setting input provided by the user using the user interface. The first camera setting input includes at least one first capture parameter value and a first number of digital image frames to capture using the at least one first capture parameter value. A first interactive display, such as any of the first interactive displays 200, 300 and 500 explained with reference to FIGS. 2, 3 and 5, respectively, may be provided to the user for receiving the first camera setting input.

At 906, the method 900 includes facilitating manual building of an image capture sequence by storing the first camera setting input in the image capture sequence. In at least one example embodiment, a sequencing operator, such as the sequencing operator explained with reference to any of the FIGS. 2 to 7B, may be displayed on the first interactive display to facilitate manual building of the image capture sequence. The image capture sequence may be stored in a memory, such as the memory 104 explained with reference to FIG. 1.

At 908, the method 900 includes receiving a second camera setting input provided by the user using the user interface. The second camera setting input includes at least one second capture parameter value and a second number of digital image frames to capture using the at least one second capture parameter value. A second interactive display, such as the second interactive display 400 explained with reference to FIG. 4 may be provided to the user for receiving the second camera setting input.

At 910, the method 900 includes storing the second camera setting input in the image capture sequence.

At 912, the method 900 includes determining if the image capture sequence is completed or not. In at least one embodiment, the determination if the image capture sequence is completed or not is performed, at least in part, based on a next user input. For example, if the user provides an input related to an actuation operator, such as the actuation operator explained with reference to any of the FIGS. 2 to 7B, then it may be determined that the manual building of the image capture sequence by the user is completed. However, if the user selects a sequencing operator, such as the sequencing operator explained with reference to any of the FIGS. 2 to 7B, then it may be determined that the user desires to make further additions to the image capture sequence and as such the manual building of the image capture sequence is not completed. If it is determined that the manual building of the image capture sequence is not completed then 914 is performed, or else, 918 is performed.

At 914, the method 900 includes receiving a subsequent camera setting input provided by the user using the user interface. The subsequent camera setting input includes at least one capture parameter value and a number of digital image frames to capture using the at least one capture parameter value.

At 916, the method 900 includes storing the subsequent camera setting input in the image capture sequence. Upon completion of the storing of the subsequent camera setting input, the method 900 includes repeating 912, 914 and 916 till it is determined that the manual building of image capture sequence is completed at 912.

At 918, the method 900 includes capturing a bracketing sequence of digital image frames by the digital camera using the image capture sequence.

FIG. 10 illustrates an example flow diagram of a method 1000 for capturing a bracketing sequence of digital image frames, in accordance with an example embodiment. Operations of the method 1000 may be performed by, among other examples, by the apparatus 100 of FIG. 1.

At 1002, the method 1000 includes providing a user interface (e.g. the user interface 106 of FIG. 1) to a user for at least one of inputting and adjusting camera settings of a digital camera.

At 1004, the method 1000 includes receiving a first camera setting input provided by the user using the user interface. The first camera setting input includes a value for at least two different capture parameters corresponding to the camera settings. A first interactive display, such as the first interactive display 500 explained with reference to FIG. 5 may be provided to the user for receiving the first camera setting input.

At 1006, the method 1000 includes facilitating manual building of an image capture sequence by storing the first camera setting input in the image capture sequence. In at least one example embodiment, a sequencing operator, such as the sequencing operator explained with reference to any of the FIGS. 2 to 7B, may be displayed on the first interactive display to facilitate manual building of the image capture sequence. The image capture sequence may be stored in a memory, such as the memory 104 explained with reference to FIG. 1.

At 1008, the method 1000 includes receiving a second camera setting input provided by the user using the user interface. The second camera setting input includes a value for at least two different second capture parameters.

At 1010, the method 1000 includes storing the second camera setting input in the image capture sequence.

At 1012, the method 1000 includes determining if the image capture sequence is completed or not. In at least one embodiment, the determination if the image capture sequence is completed or not is performed, at least in part, based on a next user input. For example, if the user provides an input related to an actuation operator, such as the actuation operator explained with reference to any of the FIGS. 2 to 7B, then it may be determined that the manual building of the image capture sequence by the user is completed. However, if the user selects a sequencing operator, such as the sequencing operator explained with reference to any of the FIGS. 2 to 7B, then it may be determined that the user desires to make further additions to the image capture sequence and as such the manual building of the image capture sequence is not completed. If it is determined that the manual building of the image capture sequence is not completed then 1014 is performed, or else, 1018 is performed.

At 1014, the method 1000 includes receiving a subsequent camera setting input provided by the user using the user interface. The subsequent camera setting input includes a value for at least two different capture parameters.

At 1016, the method 1000 includes storing the subsequent camera setting input in the image capture sequence. Upon completion of the storing of the subsequent camera setting input, the method 1000 includes repeating 1012, 1014 and 1016 till it is determined that the manual building of image capture sequence is completed at 1012.

At 1018, the method includes capturing a bracketing sequence of digital image frames by the digital camera using the image capture sequence.

Figure 11:
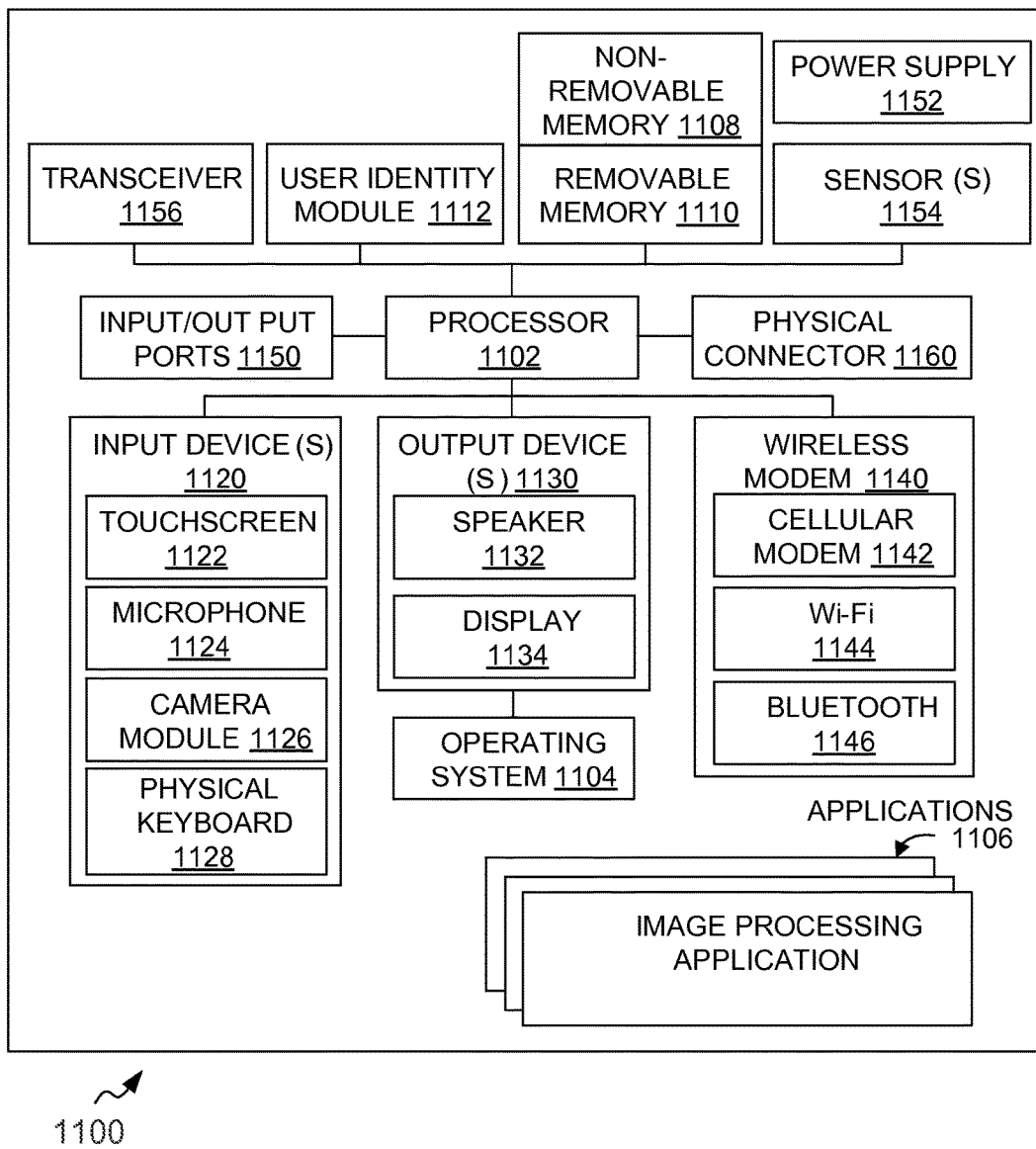
FIG. 11 illustrates an example of a mobile device capable of implementing example embodiments described herein.

Referring now to FIG. 11, a schematic block diagram of a mobile device 1100 is shown that is capable of implementing embodiments of techniques for capturing a bracketing sequence of digital image frames described herein. It should be understood that the mobile device 1100 as illustrated and hereinafter described is merely illustrative of one type of device and should not be taken to limit the scope of the embodiments. As such, it should be appreciated that at least some of the components described below in connection with the mobile device 1100 may be optional and thus in an example embodiment may include more, less or different components than those described in connection with the example embodiment of FIG. 11. As such, among other examples, the mobile device 1100 could be any of a mobile electronic devices, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the mobile device 1100 and support for one or more applications programs (see, applications 1106), configured to support capturing of digital image frames (for example, bracketing sequence of digital image frames) that implements one or more of the innovative features described herein. In addition to image capture application; the application programs can include common mobile computing applications (e.g., telephony applications, email applications, calendars, contact managers, web browsers, messaging applications) or any other computing application.

The illustrated mobile device 1100 includes one or more memory components, for example, a non-removable memory 1108 and/or removable memory 1110. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. Example of data can include web pages, text, images, sound files, image data, video data, or other data sets to be sent to and/or received from one or more network servers or other devices via one or more wired or wireless networks. The mobile device 1100 may further include a user identity module (UIM) 1112. The UIM 1112 may be a memory device having a processor built in. The UIM 1112 may include, for example, a SIM, a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The mobile device 1100 can support one or more input devices 1120 and one or more output devices 1130. Examples of the input devices 1120 may include, but are not limited to, a touch screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices (not shown) can include piezoelectric or other haptic output devices. Some devices can serve more than one input/output function. For example, the touch screen 1122 and the display 1134 can be combined into a single input/output device.

In an embodiment, the camera module 1126 may include a digital camera capable of forming a digital image file from a captured image. In some implementations, the camera module 1126 may include two or more cameras, for example, a front camera and a rear camera positioned on two sides of the mobile device 1100 (e.g., in a mobile device). As such, the camera module 1126 includes all hardware, such as a lens or other optical component(s), and software for creating a digital image file from a captured image. Alternatively, the camera module 1126 may include the hardware needed to view an image, while a memory device of the mobile device 1100 stores instructions for execution by the processor 1102 in the form of software to create a digital image file from a captured image. In an example embodiment, the camera module 1126 may further include a processing element such as a co-processor, which assists the processor 1102 in processing image data and an encoder and/or decoder for compressing and/or decompressing image data. In an embodiment, the camera module 1126 may provide live image data (viewfinder image data) to the display 1134.

A wireless modem 1140 can be coupled to one or more antennas (not shown) and can support two-way communications between the processor 1102 and external devices, as is well understood in the art. The wireless modem 1140 is shown generically and can include, for example, a cellular modem 1142 for communicating at long range with the mobile communication network, a Wi-Fi-compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the mobile device and a public switched telephone network (PSTN).

The mobile device 1100 can further include one or more input/output ports 1150, a power supply 1152, one or more sensors 1154 for example, an accelerometer, a gyroscope, a compass, or an infrared proximity sensor for detecting the orientation or motion of the mobile device 1100, a transceiver 1156 (for wirelessly transmitting analog or digital signals) and/or a physical connector 1160, which can be a USB port, IEEE 1394 (FireWire) port, and/or RS-232 port. The illustrated components are not required or all-inclusive, as any of the components shown can be deleted and other components can be added.

With the image processing applications and/or other software or hardware components, the mobile device 1100 can implement the technologies described herein. For example, the processor 1102 can facilitate capture of images or image frames of a scene through the camera 1126 and perform post-processing of the captured image frames.

Although the mobile device 1100 is illustrated in FIG. 11 in form of a smartphone, but more particularly, the techniques and solutions described herein can be implemented with connected devices having other screen capabilities and device form factors, such as a tablet computer, a virtual reality device connected to a mobile or desktop computer, an image sensor attached to a gaming console or television, and the like.

An embodiment of an apparatus comprises
a digital camera;
at least one memory comprising camera settings;
a processor communicably coupled with the digital camera and the at least one memory and configured to control operation of the digital camera together with the camera settings stored in the at least one memory; and
a user interface for at least one of inputting and adjusting the camera settings, wherein the user interface enables a user to manually define an image capture sequence comprising:
  a first camera setting input including at least one first capture parameter value and a first number of digital image frames to capture using the at least one first capture parameter value, and storing the first camera setting input in the image capture sequence; and
  a second camera setting input including at least one second capture parameter value and a second number of digital image frames to capture using the at least one second capture parameter value, and storing the second camera setting input in the image capture sequence,
wherein the processor is configured to store the so formed image capture sequence in the at least one memory, and to control the digital camera to capture a bracketing sequence of digital image frames using the first camera setting input and the second camera setting input.

In one embodiment of the apparatus the camera settings comprise adjustable settings for at least one capture parameter from among exposure compensation, shutter speed, white balance, ISO, delay, zoom, aperture, flash and flash color temperature, the adjustable settings configured to enable at least one of the inputting and the adjusting of capture parameter values corresponding to the at least one capture parameter to facilitate provisioning of the at least one first capture parameter value and the at least one second capture parameter value.

In one embodiment of the apparatus, alternatively or in addition, each capture parameter from among the at least one capture parameter is associated with an automatic setting configured to facilitate automatic selection of a capture parameter value from among a plurality of capture parameter values associated with the each capture parameter, the selected capture parameter value determined to be suitable for a current imaging environment.

In one embodiment of the apparatus, alternatively or in addition, the processor is configured to cause the user interface to present a first interactive display to the user, the first interactive display displaying the adjustable settings corresponding to the at least one capture parameter to enable the user to provide input related to the at least one first capture parameter value.

In one embodiment of the apparatus, alternatively or in addition, the processor is configured to cause the user interface to display a sequencing operator on the first interactive display for invoking a second interactive display, the second interactive display displaying the adjustable settings corresponding to the at least one capture parameter to enable the user to provide input related to the at least one second capture parameter value.

In one embodiment of the apparatus, alternatively or in addition, the adjustable settings corresponding to the at least one capture parameter displayed on the second interactive display are associated with relative capture parameter values with respect to absolute values of corresponding capture parameter values displayed on the first interactive display.

In one embodiment of the apparatus, alternatively or in addition, the processor is configured to cause the user interface to display options on the second interactive display for incrementing and decrementing a value of a capture parameter from an automatic setting value if the automatic setting value is selected for the capture parameter on the first interactive display.

In one embodiment of the apparatus, alternatively or in addition, the processor is configured to cause the user interface to display a numeral operator on each of the first interactive display and the second interactive display for receiving user input indicating a number of digital image frames corresponding to the first number of digital image frames and the second number of digital images frames, respectively.

In one embodiment of the apparatus, alternatively or in addition, each of the first number of digital image frames and the second number of digital image frames is configured to cause the digital camera to capture at least one digital image frame.

In one embodiment of the apparatus, alternatively or in addition, the processor is configured to cause the user interface to display the image capture sequence to the user.

In one embodiment of the apparatus, alternatively or in addition, the processor is configured to store the image capture sequence as a preset option in the at least one memory.

In one embodiment of the apparatus, alternatively or in addition, the user interface is configured to enable the user to actuate the digital camera to capture the bracketing sequence of digital image frames, the bracketing sequence of digital image frames captured in an order associated with the image capture sequence stored in the at least one memory.

Another embodiment of an apparatus comprises
a digital camera;
at least one memory comprising camera settings;
a processor communicably coupled with the digital camera and the at least one memory and configured to control operation of the digital camera together with the camera settings stored in the at least one memory; and
a user interface for at least one of inputting and adjusting the camera settings, wherein the user interface enables a user to manually define an image capture sequence comprising:
  a first camera setting input including a value for at least two different capture parameters, and storing the first camera setting input in the image capture sequence to be used for capturing a first digital image frame; and
  a second camera setting input including a value for at least two different capture parameters, and storing the second camera setting input in the image capture sequence to be used for capturing a second digital image frame,
wherein the processor is configured to store the so formed image capture sequence in the at least one memory, and to control the digital camera to capture a bracketing sequence of digital image frames using the first camera setting input and the second camera setting input.

In one embodiment of the apparatus, alternatively or in addition, the processor is configured to cause the user interface to present a first interactive display to the user, the first interactive display displaying adjustable settings corresponding to the at least two different capture parameters to enable the user to provide the first camera setting input.

In one embodiment of the apparatus, alternatively or in addition, the processor is configured to cause the user interface to display a sequencing operator on the first interactive display for invoking a second interactive display, the second interactive display displaying the adjustable settings corresponding to the at least two different capture parameters to enable the user to provide the second camera setting input.

In one embodiment of the apparatus, alternatively or in addition, the adjustable settings corresponding to the at least two different capture parameters displayed on the second interactive display are associated with relative capture parameter values with respect to absolute values of corresponding capture parameter values displayed on the first interactive display.

In one embodiment of the apparatus, alternatively or in addition, the user interface is configured to display the image capture sequence to the user.

An embodiment of a method comprises providing a user interface for at least one of inputting and adjusting camera settings associated with a digital camera, wherein the user interface enables a user to manually define an image capture sequence;

receiving, by a processor, a first camera setting input provided by the user using the user interface, the first camera setting input including at least one first capture parameter value and a first number of digital image frames to capture using the at least one first capture parameter value;

storing, by the processor, the first camera setting input in the image capture sequence;

receiving, by the processor, a second camera setting input provided by the user using the user interface, the second camera setting input including at least one second capture parameter value and a second number of digital image frames to capture using the at least one second capture parameter value;

storing, by the processor, the second camera setting input in the image capture sequence; and causing, by the processor, a capture of a bracketing sequence of digital image frames by the digital camera using the first camera setting input and the second camera setting input.

In one embodiment the method further comprises causing the user interface, by the processor, to present a first interactive display to the user, the first interactive display displaying adjustable settings corresponding to at least one capture parameter to enable the user to provide the first camera setting input; and causing the user interface, by the processor, to display a sequencing operator on the first interactive display for invoking a second interactive display, the second interactive display displaying the adjustable settings corresponding to the at least one capture parameter to enable the user to provide the second camera setting input.

In one embodiment, alternatively or in addition, the method further comprises causing the user interface, by the processor, to display the image capture sequence comprising the first camera setting input and the second camera setting input to the user.

Another embodiment of a method comprises providing a user interface for at least one of inputting and adjusting camera settings associated with a digital camera, wherein the user interface enables a user to manually define an image capture sequence;

receiving, by a processor, a first camera setting input provided by the user using the user interface, the first camera setting input including a value for at least two different capture parameters;

storing, by the processor, the first camera setting input in the image capture sequence;

receiving, by the processor, a second camera setting input provided by the user using the user interface, the second camera setting input including a value for at least two different capture parameters;

storing, by the processor, the second camera setting input in the image capture sequence; and causing, by the processor, a capture of a bracketing sequence of digital image frames by the digital camera using the first camera setting input and the second camera setting input.

Various example embodiments offer, among other benefits, techniques for capturing a bracketing sequence of digital image frames. Embodiments disclosed herein provide an easy way for the user to manually build an image capture sequence so as to capture multiple images of a scene with their regular digital cameras while precluding the need to maintain a dedicated bracketing application. The embodiments disclosed herein preclude tedious and repetitive adjustment to camera settings after each image capture operation while also precluding an un-desirable time delay between two captured images on account of manual input of settings subsequent to each captured image.

In at least some embodiments, one or more image capture sequences manually built by the user may be stored in the memory of the apparatus as preset options and the user may easily retrieve an image capture sequence from the memory whenever needed and capture a bracketing sequence of digital image frames. In one or more embodiments, the visual display of the image capture sequence enables the user to make any corrective changes to the settings, if needed, prior to the actuation of capture of the bracketing sequence of digital image frames. Further, in many embodiments, displaying relative capture parameter values as well as options from incrementing/decrementing a capture parameter value from an auto setting enables the user to configure the settings in an intuitive manner.

Furthermore, various example embodiments may be implemented in a wide variety of devices, network configurations and applications for example, in camera devices, in mobile devices or as part of software imaging applications used in any electronic devices.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

Alternatively, or in addition, the functionality described herein (such as the image processing instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An apparatus comprising:
a digital camera;
at least one memory comprising camera settings;
a processor communicably coupled with the digital camera and the at least one memory and configured to control operation of the digital camera together with the camera settings stored in the at least one memory; and
a user interface for at least one of inputting and adjusting the camera settings, wherein the user interface enables a user to manually define an image capture sequence comprising:
a first camera setting input including at least one first capture parameter value and a first number of digital image frames to capture using the at least one first capture parameter value, and storing the first camera setting input in the image capture sequence; and
a second camera setting input including at least one second capture parameter value and a second number of digital image frames to capture using the at least one second capture parameter value, and storing the second camera setting input in the image capture sequence,
wherein the processor is configured to store the so formed image capture sequence in the at least one memory, and to control the digital camera to capture a bracketing sequence of digital image frames using the first camera setting input and the second camera setting input such that a first set of image frames of the bracketing sequence are captured using the first camera setting input or the second camera setting input, and wherein a second set of the image frames of the bracketing sequence are captured using both the first camera setting input and the second camera setting input, wherein the second set of the image frames are captured subsequent to the first set of the image frames.

2. The apparatus of claim 1, wherein the camera settings comprise adjustable settings for at least one capture parameter from among exposure compensation, shutter speed, white balance, ISO, delay, zoom, aperture, flash and flash color temperature, the adjustable settings configured to enable at least one of the inputting and the adjusting of capture parameter values corresponding to the at least one capture parameter to facilitate provisioning of the at least one first capture parameter value and the at least one second capture parameter value.

3. The apparatus of claim 2, wherein each capture parameter from among the at least one capture parameter is associated with an automatic setting configured to facilitate automatic selection of a capture parameter value from among a plurality of capture parameter values associated with the each capture parameter, the selected capture parameter value determined to be suitable for a current imaging environment.

4. The apparatus of claim 2, wherein the processor is configured to cause the user interface to present a first interactive display to the user, the first interactive display displaying the adjustable settings corresponding to the at least one capture parameter to enable the user to provide input related to the at least one first capture parameter value.

5. The apparatus of claim 4, wherein the processor is configured to cause the user interface to display a sequencing operator on the first interactive display for invoking a second interactive display, the second interactive display displaying the adjustable settings corresponding to the at least one capture parameter to enable the user to provide input related to the at least one second capture parameter value.

6. The apparatus of claim 5, wherein the adjustable settings corresponding to the at least one capture parameter displayed on the second interactive display are associated with relative capture parameter values with respect to absolute values of corresponding capture parameter values displayed on the first interactive display.

7. The apparatus of claim 5, wherein the processor is configured to cause the user interface to display options on the second interactive display for incrementing and decrementing a value of a capture parameter from an automatic setting value if the automatic setting value is selected for the capture parameter on the first interactive display.

8. The apparatus of claim 5, wherein the processor is configured to cause the user interface to display a numeral operator on each of the first interactive display and the second interactive display for receiving user input indicating a number of digital image frames corresponding to the first number of digital image frames and the second number of digital images frames, respectively.

9. The apparatus of claim 1, wherein each of the first number of digital image frames comprises a plurality of images and the second number of digital image frames comprises a plurality of images.

10. The apparatus of claim 1, wherein the processor is configured to cause the user interface to display the image capture sequence to the user.

11. The apparatus of claim 1, wherein the processor is configured to store the image capture sequence as a preset option in the at least one memory.

12. The apparatus of claim 1, wherein the user interface is configured to enable the user to actuate the digital camera to capture the bracketing sequence of digital image frames, the bracketing sequence of digital image frames captured in an order associated with the image capture sequence stored in the at least one memory.

13. An apparatus comprising:
a digital camera;
at least one memory comprising camera settings;
a processor communicably coupled with the digital camera and the at least one memory and configured to control operation of the digital camera together with the camera settings stored in the at least one memory; and
a user interface for at least one of inputting and adjusting the camera settings, wherein the user interface enables a user to manually define an image capture sequence comprising:
a first camera setting input including a value for at least two different capture parameters, and storing the first camera setting input in the image capture sequence to be used for capturing a first digital image frame; and
a second camera setting input including a value for at least two different capture parameters, and storing the second camera setting input in the image capture sequence to be used for capturing a second digital image frame,
wherein the processor is configured to store the so formed image capture sequence in the at least one memory, and to control the digital camera to capture a bracketing sequence of digital image frames using the first camera setting input and the second camera setting input such that a first set of image frames of the bracketing sequence are captured using the first camera setting input or the second camera setting input, and wherein a second set of the image frames of the bracketing sequence are captured using both the first camera setting input and the second camera setting input, wherein the second set of the image frames are captured subsequent to the first set of the image frames.

14. The apparatus of claim 13, wherein the processor is configured to cause the user interface to present a first interactive display to the user, the first interactive display displaying adjustable settings corresponding to the at least two different capture parameters to enable the user to provide the first camera setting input.

15. The apparatus of claim 14, wherein the processor is configured to cause the user interface to display a sequencing operator on the first interactive display for invoking a second interactive display, the second interactive display displaying the adjustable settings corresponding to the at least two different capture parameters to enable the user to provide the second camera setting input.

16. The apparatus of claim 15, wherein the adjustable settings corresponding to the at least two different capture parameters displayed on the second interactive display are associated with relative capture parameter values with respect to absolute values of corresponding capture parameter values displayed on the first interactive display.

17. The apparatus of claim 13, wherein the user interface is configured to display the image capture sequence to the user.

18. A method, comprising:
providing a user interface for at least one of inputting and adjusting camera settings associated with a digital camera, wherein the user interface enables a user to manually define an image capture sequence;
receiving, by a processor, a first camera setting input provided by the user using the user interface, the first camera setting input including at least one first capture parameter value and a first number of digital image frames to capture using the at least one first capture parameter value;
storing, by the processor, the first camera setting input in the image capture sequence;
receiving, by the processor, a second camera setting input provided by the user using the user interface, the second camera setting input including at least one second capture parameter value and a second number of digital image frames to capture using the at least one second capture parameter value;
storing, by the processor, the second camera setting input in the image capture sequence; and
causing, by the processor, a capture of a bracketing sequence of digital image frames by the digital camera using the first camera setting input and the second camera setting input such that a first set of image frames of the bracketing sequence are captured using the first camera setting input or the second camera setting input, and wherein a second set of the image frames of the bracketing sequence are captured using both the first camera setting input and the second camera setting input, wherein the second set of the image frames are captured subsequent to the first set of the image frames.

19. The method of claim 18, further comprising:
causing the user interface, by the processor, to present a first interactive display to the user, the first interactive display displaying adjustable settings corresponding to at least one capture parameter to enable the user to provide the first camera setting input; and
causing the user interface, by the processor, to display a sequencing operator on the first interactive display for invoking a second interactive display, the second interactive display displaying the adjustable settings corresponding to the at least one capture parameter to enable the user to provide the second camera setting input.

20. The method of claim 18, further comprising:
  causing the user interface, by the processor, to display the image capture sequence comprising the first camera setting input and the second camera setting input to the user.

* * * * *